US012086897B2

(12) United States Patent
Luo et al.

(10) Patent No.: US 12,086,897 B2
(45) Date of Patent: Sep. 10, 2024

(54) DYNAMIC OPTIMIZED REASSIGNMENT OF PROVIDERS AT A GEOHASH LEVEL

(71) Applicant: Lyft, Inc., San Francisco, CA (US)

(72) Inventors: Jianzhe Luo, San Francisco, CA (US);
Danial Afzal, San Francisco, CA (US);
Jatin Chopra, San Francisco, CA (US);
Christopher Sholley, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 822 days.

(21) Appl. No.: 15/582,253

(22) Filed: Apr. 28, 2017

(65) Prior Publication Data

US 2018/0315148 A1  Nov. 1, 2018

(51) Int. Cl.
| | |
|---|---|
| *G06Q 50/40* | (2024.01) |
| *G06Q 10/0631* | (2023.01) |
| *G06Q 50/43* | (2024.01) |
| *G06Q 50/47* | (2024.01) |

(52) U.S. Cl.
CPC ....... *G06Q 50/40* (2024.01); *G06Q 10/06313* (2013.01); *G06Q 50/47* (2024.01); *G06Q 50/43* (2024.01)

(58) Field of Classification Search
CPC ............ G06Q 10/06313; G06Q 50/30; G06Q 50/40; G06Q 50/47; G06Q 50/43
USPC ...................................................... 705/7.23
See application file for complete search history.

(56) References Cited

U.S. PATENT DOCUMENTS

| | | | |
|---|---|---|---|
| 9,769,616 B1* | 9/2017 | Pao .................. | H04W 4/023 |
| 2008/0195428 A1* | 8/2008 | O'Sullivan .......... | G06Q 10/025 |
| | | | 705/6 |
| 2012/0324260 A1* | 12/2012 | Kezuka ............ | H04N 21/44222 |
| | | | 713/320 |
| 2014/0011522 A1* | 1/2014 | Lin .................. | H04W 4/02 |
| | | | 455/456.2 |
| 2015/0012320 A1* | 1/2015 | Juckett ............... | G06Q 10/0631 |
| | | | 705/7.16 |
| 2015/0161564 A1* | 6/2015 | Sweeney .......... | G06Q 10/08355 |
| | | | 705/338 |
| 2016/0034828 A1* | 2/2016 | Sarawgi ............ | G06Q 10/00 |
| | | | 705/5 |
| 2017/0227371 A1* | 8/2017 | O'Mahony .......... | G06Q 10/047 |
| 2018/0095977 A1* | 4/2018 | Reddy ............... | G06F 16/24575 |
| 2018/0314998 A1* | 11/2018 | Liu .................. | G06Q 50/40 |

OTHER PUBLICATIONS

Dynamic Rideshare Optimized Matching problem Ghoseiri, Keivan. University of Maryland, College Park ProQuest Dissertations Publishing, 2012.3543179.*

* cited by examiner

*Primary Examiner* — Renae Feacher
(74) *Attorney, Agent, or Firm* — Keller Preece PLLC

(57) ABSTRACT

Embodiments provide techniques, including systems and methods, for assignment and/or reassignment of transport requests received within a request matching time period. For example, transport requests received during a request matching time period, as well as requests determined to be eligible during the request matching time period for reassignment, are associated with a location identifier (e.g., geohash) and are pooled at a dynamic transportation matching system in order for a dynamic assignment and/or reassignment that may reduce a metric (e.g., an overall estimated time of arrival (ETA) for requests) associated with the dynamic transportation matching system.

20 Claims, 16 Drawing Sheets

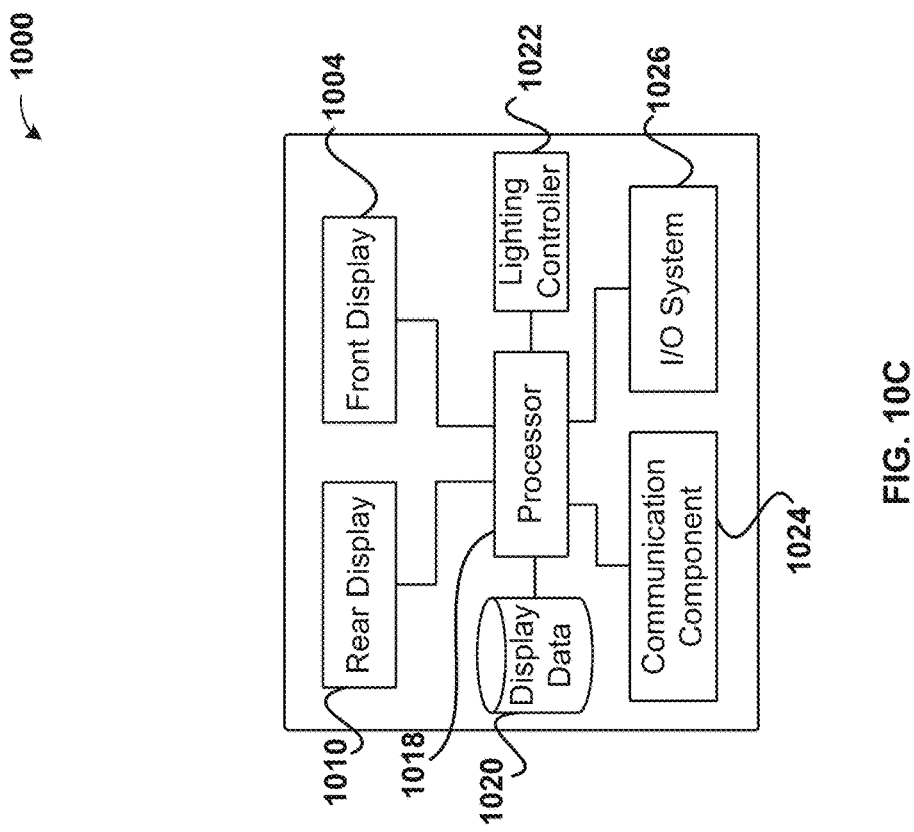
FIG. 10C
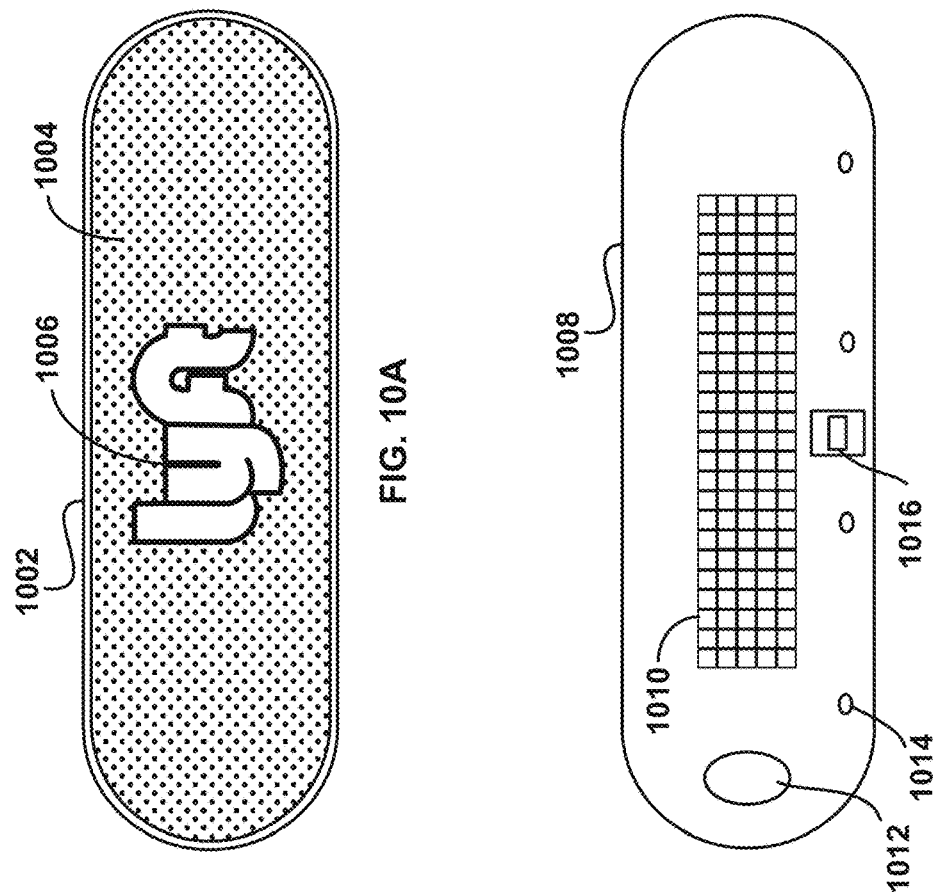
FIG. 10A
FIG. 10B

DYNAMIC OPTIMIZED REASSIGNMENT OF PROVIDERS AT A GEOHASH LEVEL

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. However, the mobile nature of requestors and providers, along with the unpredictable stream of requests in various geographical areas, can make efficient assigning of available providers to requests difficult. For example, recently-created provider assignments may not reflect a current need in a particular geographic area, which can lead to cancelled requests as well as duplicated requests in a short period of time as users find their requests unfulfilled and place new requests. This leads to inefficient resource allocation as cancelled and duplicated requests increase bandwidth and processing needs, as well as disrupting efficient allocation of resources in a geographic area.

BRIEF DESCRIPTION OF THE DRAWINGS

Various embodiments in accordance with the present disclosure will be described with reference to the drawings, in which:

FIGS. 10A-10C illustrates an example provider communication device in accordance with various embodiments.

DETAILED DESCRIPTION

Figure 1:
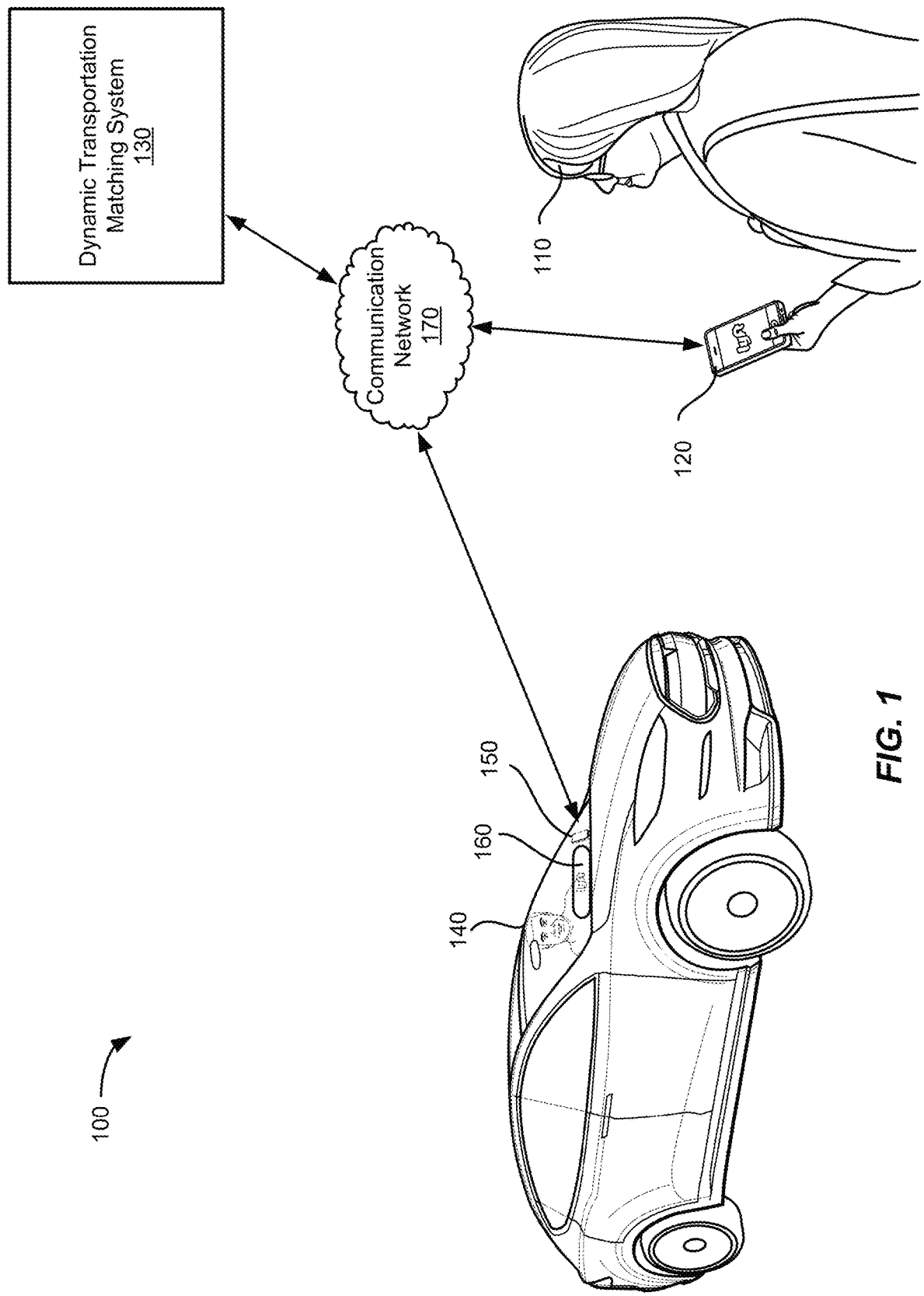
FIG. 1 illustrates an example of a transport matching system including a matched provider and requestor, in accordance with an embodiment of the present techniques.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services, such as a transportation matching service that matches riders and drivers and being accessed through mobile devices, are becoming more prevalent. However, due to the distributed and portable nature of providers and requestors being matched by an on-demand matching system, matching providers (e.g., drivers such as in an on-demand ride matching environment, autonomous vehicles or other vehicles without a primary human driver or controller, delivery services, etc.) and requestors efficiently can be difficult. For example, requests may be matched with an available provider immediately upon being received by a matching system. While this may result in potentially quick matches for a requestor, it can also result in unintended difficulties and inefficiencies in the operation and results of the matching service. For example, a requestor places a request and is quickly matched with a provider that has an estimated time of arrival (ETA) to the requestor of three minutes. However, a few seconds after the match is made, another provider becomes available (e.g., goes "online," has a cancelled request, etc.) that would have an ETA to the requestor of thirty seconds. If the request had not been immediately matched, such as by being pooled for a duration of time prior to being assigned, then the newly-available provider could have been matched with the request, resulting in an overall savings of 2.5 minutes and allowing more efficient operation of the matching service. Additionally, once the provider with the three-minute ETA is matched with the requestor, and a new provider with the thirty-second ETA comes online, another request may be received that is thirty seconds away from the already-matched provider but five minutes away from the newly-available provider. Because the matched provider is already locked into the request with the three-minute ETA, the newly-available provider is matched with the new request for a five-minute ETA. Therefore, the matching service now has two providers matched with requests that are not the closest possible requests (e.g., have the smallest ETA), despite the requests being received in a small window of time.

In some cases, a specific technical problem solved by the techniques described herein, which can be caused in an example by inefficient matching of providers and requests in a dynamic on-demand online system for matching requests with providers, is that if there are no providers available at the time of a request, then the request could lapse. As a result, the requestor may immediately generate a subsequent request that is sent to the matching service, which subsequent request may also lapse if no providers are available at the time of the subsequent request (although a provider actually may have been available briefly but been matched to a different request received in the interim between the repeated requests). The requestor may generate another request, and the pattern continues to repeat. In some instances, if enough requestors keep generating repeat requests to the matching service within a short period of time, then the matching service may crash under the strain of the sheer number and frequency of the requests.

Another specific technical problem solved by the techniques described herein relates to computationally intensive processes to evaluate requests and providers. For example, evaluating every potential provider in relation to every request received to a matching service can require massive amounts of processor utilization, bandwidth, and memory. Some matching approaches can approach an exponential running time, which may be feasible for a limited number of requests and providers, but if the system suddenly receives ten times the limited requests and/or ten times the limited number of providers become available, then the matching service may be overwhelmed and cease to operate normally and/or efficiently.

Accordingly, inefficient matching of requests and providers (e.g., a "greedy" approach that matches the first eligible available provider to each request, etc.) leads to mismanagement of provider resources as well as increased system resource usage (e.g., data processing, bandwidth, system communications, etc.). As previously discussed, requestors may generate numerous and frequent cancellations and subsequent requests if they do not receive a timely match. Also, providers may cancel a matched request if the ETA is too large, and/or if they become aware of a closer request. Thus, requestors must place more requests in order to obtain a ride as one or more matched requests are canceled by the provider. Accordingly, more requests may be generated and processed by a matching service, more accepted, rejected, and declined requests must be processed by the requestor and provider devices, and more system resources must be expended for a requestor and provider to be successfully matched in an efficient manner (e.g., minimizing ETA, etc.). Cascading requests and cancellations can lead to provider downtime, as multiple providers accept the soon-to-be-cancelled transport requests in lieu of other requests. The cancelled providers may also grow frustrated with the cancellations and stop providing transport altogether in a particular area, leading to a lack to provider service in that area, potentially at a time of actual high demand.

Accordingly, inefficient matching approaches lead to mismanagement of provider resources as well as increased data processing and system communications as delay accumulates and cascading requests and cancellations are sent to a transport matching system. Therefore, the techniques described herein improve the operation and efficiency of a transportation matching system, as well as the computing systems utilized as part of the transportation matching system infrastructure. For example, by alleviating technical problems specific to dynamic transportation matching systems of, for example, inefficient matching of requests and providers, excessively computationally intensive processes to evaluate requests and providers, and cascading requests and cancellations (e.g., "button mashing"), among other problems, the techniques described herein improve the computer-related technology of at least network-based transportation matching systems by increasing computational efficiency and computer resource allocation of the computer systems on which the techniques are performed.

At least one embodiment provides techniques, including systems and methods, for determining optimal provider and requestor assignments in a dynamic and/or substantially real-time approach. In one embodiment, a transport request (e.g., a ride request, a delivery request, etc.) is received by a dynamic transportation matching system. The transport request may be associated with a particular location identifier (e.g., a geohash) of one or more location identifiers in a geographical location serviced by the dynamic transportation matching system. In an example, different location identifiers may correspond to a same geographic location, such as if geographic locations are defined/represented in terms of geohash precision 6. A geohash may be defined as a unique identifier of a specific region on the Earth; for example, using a geocoding system that comprises hierarchical spatial data structures that can operate to subdivide space into buckets of grid shape. A geohash may be of varying precision and/or resolution; for example, geohash-5 versus geohash-6. A geohash can be a convenient way of expressing a location (anywhere in the world) using, for example, a short alphanumeric string, such as short URLs which uniquely identify positions on the Earth, so that referencing them in emails, forums, websites, computer systems, etc. is more convenient. The transport request is received within a request matching time period (e.g., a duration of time occurring at a fixed frequency, etc.) and is associated with (e.g., pooled with) other transport requests received within the request matching time period. For example, a request matching time period of two seconds may begin, and the request associated with a geohash may be received within the period and placed into a pool of other requests received within the two-second request matching time period, each of the other requests also being associated with a geohash. In an embodiment, at the end of the request matching time period, the pooled transport requests are assigned to an eligible provider indicated as being available. In an embodiment, no providers may be indicated as available for assignment when the transport request is received, but by pooling the requests and waiting out the request matching time period, a provider may be identified and matched. In an embodiment, each of the providers are also associated with a geohash of one or more geohashes, and are indicated as being available for assignment (e.g., each provider either does not have a matched requestor or can be reassigned from a currently-matched request, etc.). Once the request matching time period ends, the transport request is assigned to one of the available providers, which may be associated with a different geohash than that associated with the transportation request, and the provider may have previously been assigned to a different previous transport request (e.g., before the current request matching time period). For example, a request in one geohash may be assigned to a provider in another geohash, the provider having been reassigned to the request from a previously matched request. This pooling and reassignment of transport requests may allow a provider to be reassigned to a request offering a lower ETA, while the provider's originally matched request may then be reassigned to another provider that may offer a comparable or lower ETA. In various embodiments, a "match" may mean an initial assignment or a subsequent reassignment of a provider to a requestor.

In an embodiment, a number of potential requests and providers evaluated for assignment and/or reassignment, such as during a request matching time period, may be reduced by analyzing factors such as an aggregate demand and supply associated with each geohash. For example, as discussed earlier, an evaluation of ETAs for every eligible and/or available provider with respect to every request received by a system can result in an excessively complicated processing problem. By reducing a number of the requests and providers ultimately evaluated, such as in a pooling approach over a request matching time period, then the matching service may operate at a higher efficiency and reliability. In one embodiment, an association between geohashes is determined, and assignments are only evaluated and made within the same geohash or across associated geohashes. In an embodiment, geohashes may be determined to be associated based on factors such as a mean ETA between the geohashes and a demand/supply ratio in the geohash with the provider. For example, a historical demand/supply ratio for the geohash may be used and/or a forecasted future demand/supply ratio in the geohash to determine if a geohash is associated with another geohash (e.g., whether a provider in one geohash can be assigned to a request in the associated geohash).

Additionally, one or more embodiments may determine a modified ETA for providers from a particular geohash. For example, a portion of provider supply in a geohash may be protected in order to service anticipated future demand in that geohash. In an embodiment, this is accomplished by determining a virtual penalty associated with each geohash that is added to an ETA associated with a provider in that geohash, the virtual penalty in an embodiment representing an opportunity cost for the geohash incurred by assigning a provider to service a request from a separate geohash. As discussed herein, the virtual penalty may be represented in time values, such as ETA values, as well as in other values such as currency (e.g., dollar amounts, such as if an objective function of the optimization matching approach is in dollars, etc.). For example, the virtual penalty may be based on a predicted increase in a number of transport requests expected to be received in the particular geohash within a threshold amount of time. This virtual penalty may be added to an ETA as described herein, as part of determining assignments between providers and requests.

According to various embodiments, constraints may be implemented as part of a determination of a particular provider to be assigned to a particular request. For example, a provider that has been assigned to a request and which has an ETA less than a threshold amount of time may not be indicated as eligible for being assigned to a request in the pool of requests (e.g., is excluded from the pool). As another example, a provider who has been reassigned more than a threshold amount of times within a period of time is excluded from the pool, as may be a requestor associated with the request to which the provider is currently assigned to. As another example, a provider whose associated request has been reassigned to another provider will receive a subsequent request with an ETA no greater than the previous ETA plus a threshold duration. As another example, a requestor associated with a request that has been reassigned to another provider will be assigned to another provider, such that their ETA with the subsequent provider does not increase by more than a threshold duration from the original request's ETA.

According to an embodiment, geographical areas may be logically partitioned (e.g., virtually in a computer system representation of the geographical area as opposed to physical partitions) in order to reduce a number of potential providers and requests to be evaluated in order to determine a match. For example, an area (e.g., a graph of demand nodes in an un-directed graph data representation) can be partitioned into non-overlapping subgraphs such that an optimization problem for each sub-graph can be solved more efficiently, while solving an optimization problem for the entire graph may be inefficient. For example, a relationship between any two requestors is determined (e.g., an edge in an un-directed graph representation), and a number of providers eligible and/or available to be matched with both of the requestors is assigned to the relationship (e.g., a weight assigned to the edge). A logical boundary is then determined, the edges of the boundaries crossing a virtual arc (i.e., the edge with the associated weight) between each grouping of two requestors such that the boundary lines cross a set of arcs having a minimum total associated weight. Also, a set of boundaries can be determined to create two or more subgraphs from a single graph. The creation of the boundaries may be performed during each request matching time period.

Accordingly, embodiments pool requests and providers for a subsequent global dynamic assignment that will increase the efficiency of the system and optimize the matching system's request matching processing to minimize the number of requests that will require system resources to process. Accordingly, request matching systems are improved through the more efficient matching processing and fewer resources are required to process the same amount of requestor demand.

Although examples described herein generally focus on on-demand ride-sharing applications, any suitable service may be performed using similar functionality. For example, delivery of services may have a similar process implemented to find the location of delivery of the service.

FIG. 1 illustrates an example of a dynamic transportation matching system 130 including a matched provider 140A and requestor 110A, in accordance with an embodiment of the present techniques. The dynamic transportation matching system 130 may be configured to communicate with both the requestor computing device 120 and the provider computing device 150. The provider computing device 150 may be configured to communicate with a provider communication device 160 that is configured to easily and efficiently display information to a provider 140 and/or a requestor 110. The requestor 110 may use a ride matching requestor application on a requestor computing device 120 to request a ride at a specified pick-up location, or an inferred pickup location (e.g., determined from potentially noisy or missing GPS data, time of day, the requestor's calendar, and/or historical use of the dynamic transportation matching system, etc.). The request may be sent over a communication network 170 to the dynamic transportation matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), a number of passengers, a requestor preference for specific car types, and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. side-streets, temperature, music preference (link to 3$^{rd}$ party music provider profile, etc.), personalized pattern/color to display on provider communication device, etc.) and requestor transport restrictions (e.g., pet friendly, child seat, wheelchair accessible, etc.).

The requestor computing device may be used to request services (e.g., a ride or transportation, a delivery, etc.) that may be provided by the provider 140A. The provider computing device may be used to contact available providers and match a request with an available provider. The dynamic transportation matching system (also referred to as a "dynamic transportation matching system") 130 may identify available providers that are registered with the dynamic transportation matching system 130 through an application on their provider communication device 150A. The dynamic transportation matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. A request may be "queued" such that it is "retried" at a later time, for example if there are no qualified providers available at the request time. This saves the requestor from making a duplicate request at a later time and thereby saves computing resources, as discussed herein. In an embodiment, an autonomous vehicle may be automatically matched to a request without a provider explicitly receiving or accepting the request. The provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the provider providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the dynamic transportation matching system 130 may dynamically match requestors and providers that are distributed throughout a geographic area.

Figure 2A:
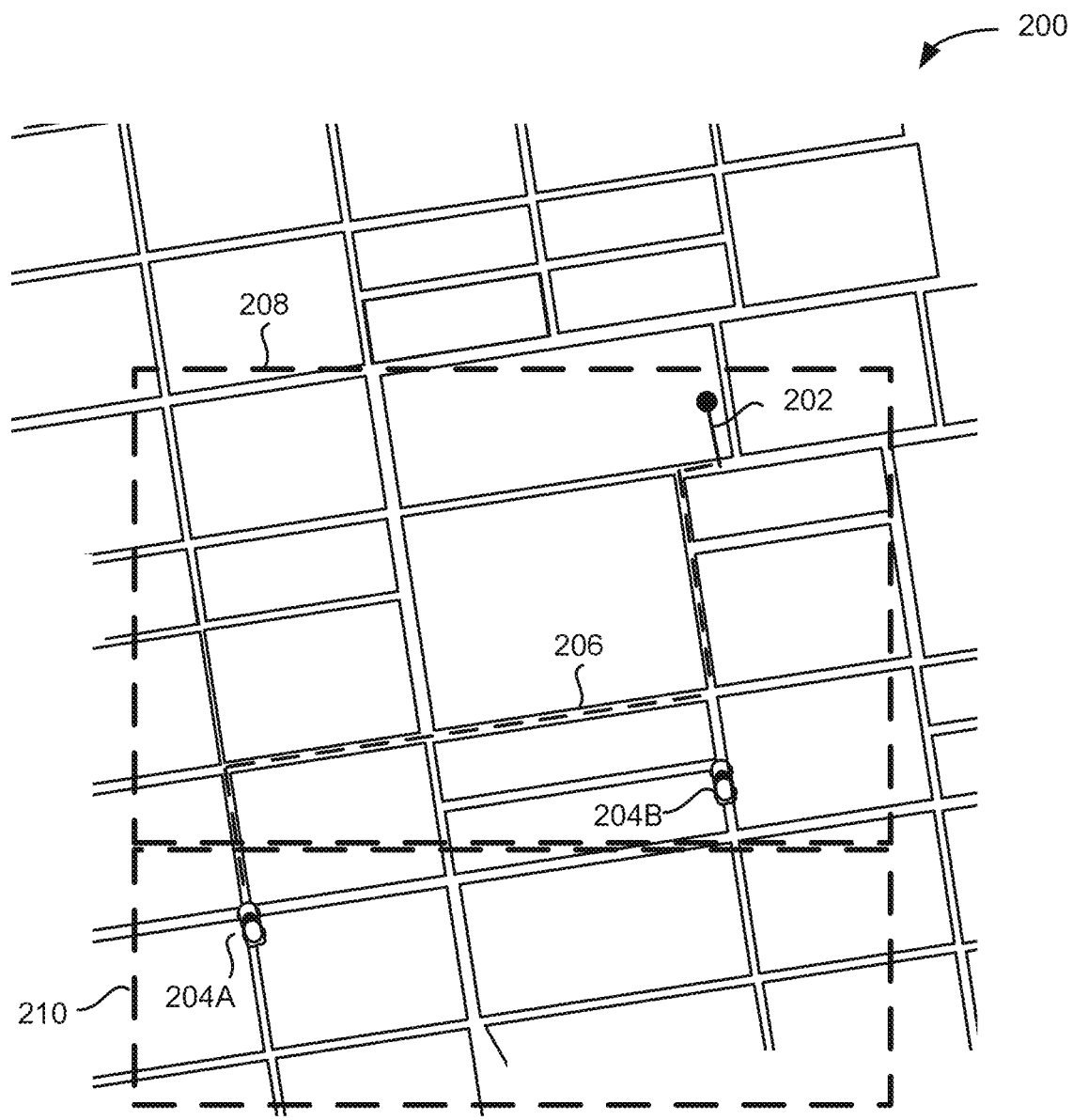
FIGS. 2A-2C illustrate example approaches for dynamically reassigning transportation requests by a dynamic transportation matching system, in accordance with an embodiment of the present techniques.
Figure 2B:
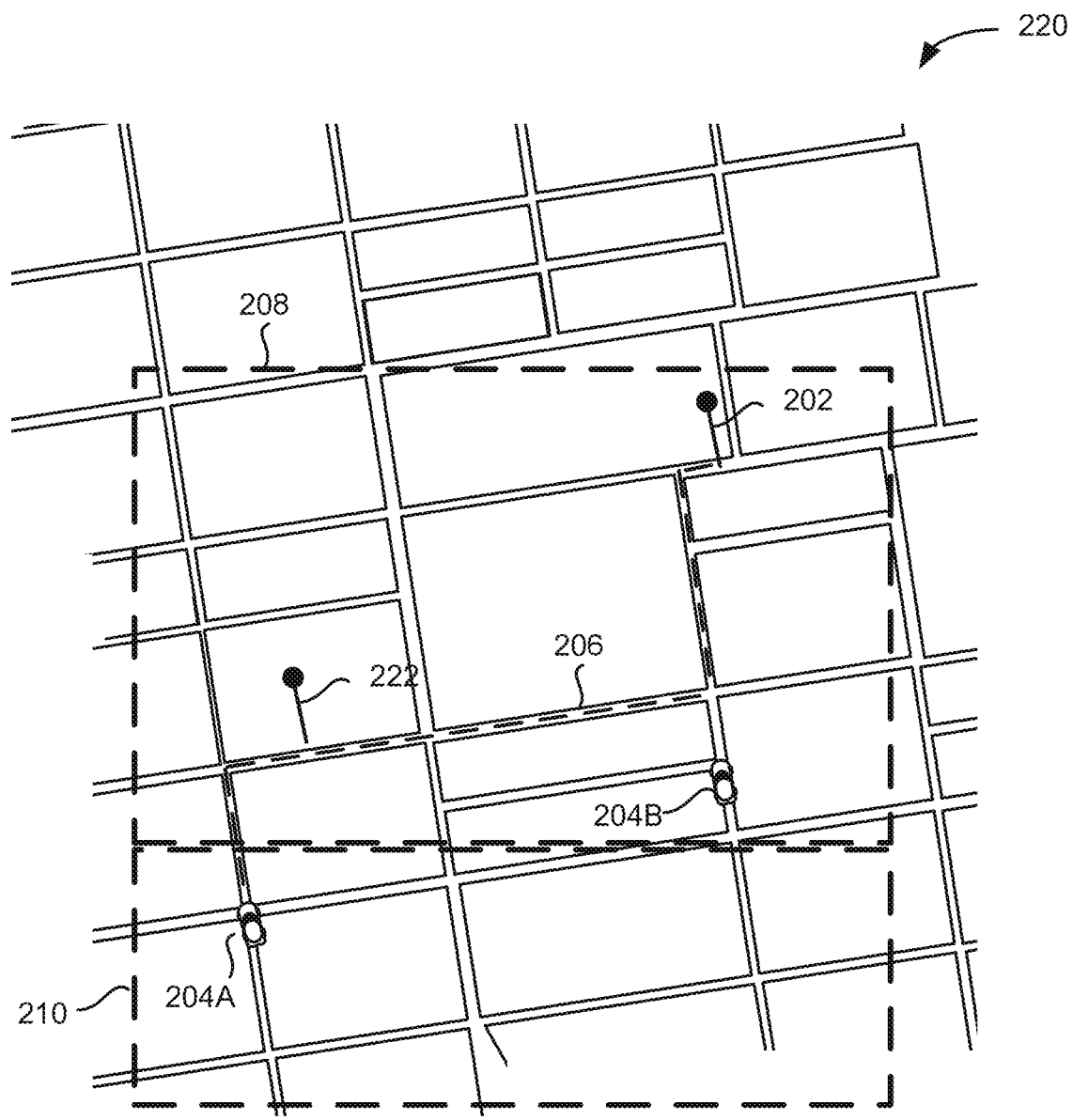
Figure 2C:
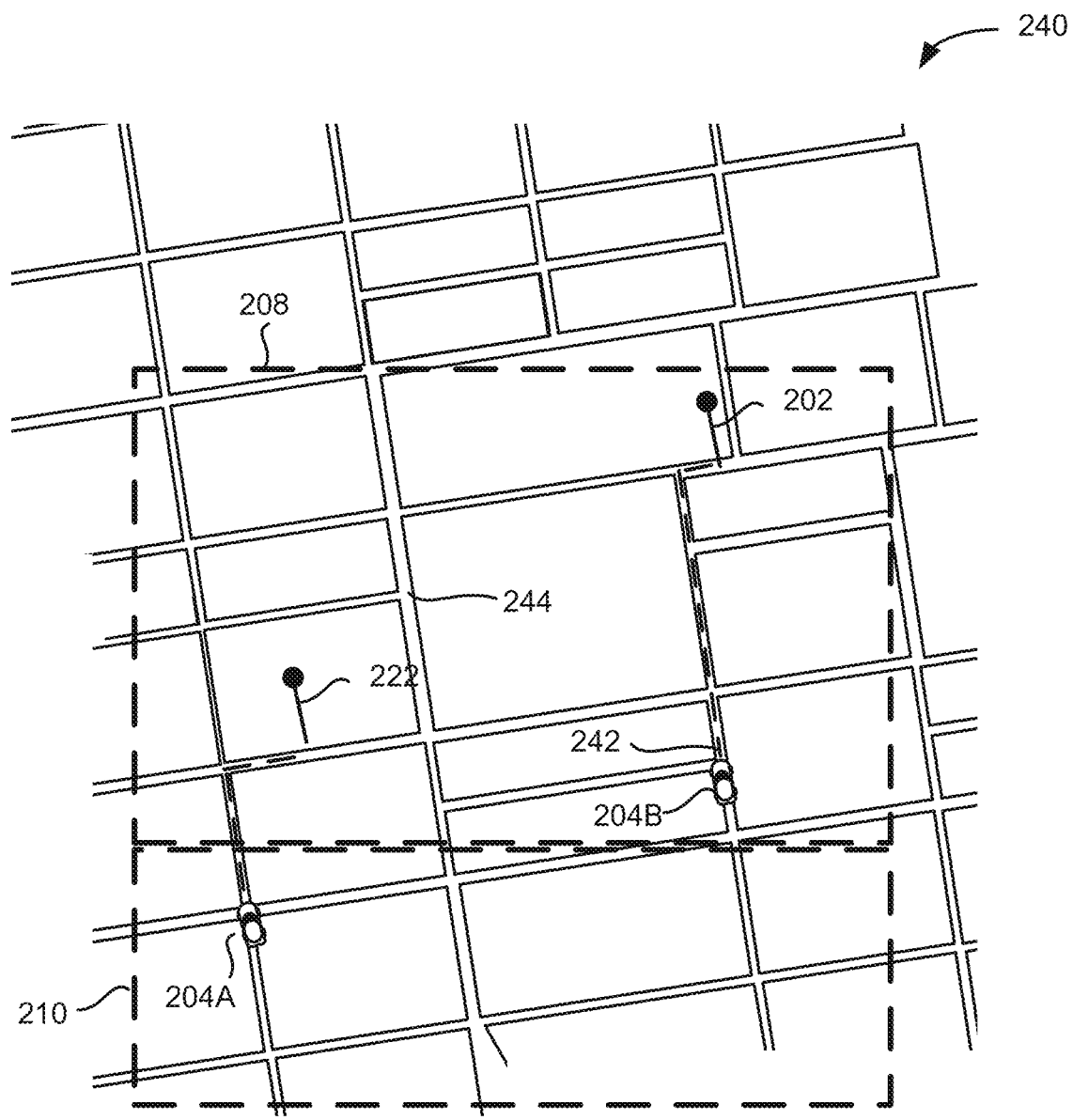

FIGS. 2A-2C illustrate example approaches for dynamically reassigning transportation requests by a dynamic transportation matching system, in accordance with an embodiment of the present techniques. In the example 200 of FIG. 2A, an initial request 202 is located within a geohash 208 in a geographical area, and an initial provider 204A is located within a separate geohash 210 in a geographical area. The initial provider 204A is matched with the request (e.g., the request having the request location 202 has been accepted by the provider 204A), and a route 206 to the request location is illustrated, the route 206 being associated with an ETA by which the initial provider 204A will arrive to the initial request 202. Another subsequent provider 204B becomes eligible and available for matching; e.g., the provider is in an associated geohash and either is not currently matched to a request or can be reassigned to a request.

In the example 220 of FIG. 2B, a request matching time period has begun, and a new request 222 is received. Under a greedy matching approach, the eligible, subsequent provider 204B would be matched to the new request 222; however, the techniques described herein envision a request matching time period of a particular duration occurring at a regular frequency, during which (e.g., at the end of) requests eligible to be assigned and providers eligible and available for assignment are globally and dynamically assigned. In an embodiment, the frequency may be dynamically determined, for example to favor matching each requestor to the nearest provider in lieu of attempting to find a global optimum set of matches, if matching each requestor to the nearest provider is determined to conserve computing resources without increasing total ETAs across all matches in the system above a threshold amount. This may include, as described herein, a reassignment of currently assigned requests and/or providers.

In the example 240 of FIG. 2C, the request matching time period has concluded and a matching process is initiated. In this example, the initial provider 204A previously matched to the initial request 202 has been reassigned to the new request 222, with a new route 244 having an ETA, and the subsequent provider 204B has been assigned to the initial request 202 along a generated route 242 having an ETA. According to an embodiment, prior to including either the initial request 202 or the new request 222 in the pool of requests defined at least in part by the request matching time period, an association between the two geohashes 208, 210 is determined. In an embodiment, the association may be determined based on at least one ride request in one of the geohashes being matched to a provider in the other geohash, which in turn is based on historical and/or forecasted supply/demand ratio in the geohash associated with the provider. For example, an ETA within which the initial provider 204A will arrive at the initial request 202 is determined. A virtual penalty associated with assigning providers from the geohash 210 associated with the initial provider 204A to the other geohash 208 is determined, for example based on an increase in a number of transport requests predicted to occur in the geohash 210 associated with the initial provider 204A. This virtual penalty may in various embodiments be considered to protect a supply of providers in a geohash; namely, by approximating a marginal value (e.g., in time such as ETA values, in currency such as dollar amounts, such as if an objective function of the optimization matching approach is in dollars, etc.) of having a driver in a particular geohash. For example, if the virtual penalty for a particular geohash is calculated to be 30 seconds, that may be considered to represent that by increasing supply (e.g., by one unit) in that geohash, the average ETA in the matching system (e.g., across all geohashes) may be reduced by 30 seconds. Additionally, a driver in a particular geohash may be assigned to a request in another geohash if a corresponding marginal benefit in terms of ETA is larger than the opportunity cost (e.g., the virtual penalty).

In the example 240 of FIG. 2C, the ETA for the initial request 202 is modified by the virtual penalty (e.g., a virtual time penalty is added to the ETA), and it is determined whether the modified ETA is less than an ETA associated with the subsequent provider 204B arriving to the initial request 202. If it is less, then the initial provider 204A will "keep" the request at the end of the request matching time period in the examples of FIGS. 2A-2C; however, if the modified ETA is greater than an ETA associated with the subsequent provider 204B arriving to the initial request 202, then the initial provider 204A is re-assigned to the new request 222, which is the result illustrated in FIG. 2C. In an embodiment, a virtual penalty (or virtual currency penalty, as discussed earlier) may be applicable to an assignment, but not applicable after a provider is matched (e.g., accepts the assignment).

According to an embodiment, various constraints and determinations may be made to decide whether a particular provider and/or request is to be included in the "pooling" of requests and the assignment of providers, and under what conditions such assignments may be made. For example, in the example of FIG. 2C, a determination is made (e.g., during the request matching time period) that the subsequent provider 204B is eligible and available to be assigned. If the requestor associated with the initial request 202 is going to be reassigned to the subsequent provider 204B, then it is determined whether the new ETA for the subsequent provider 204B to arrive to the initial request 202 is less than or equal to the ETA associated with the initial provider 204A's assignment to the initial request 202, plus a threshold amount of time. If so, then a reassignment as illustrated in FIG. 2C may be performed; otherwise, the initial request 202 may be excluded or dropped from the "pool" of requests generated during the request matching time period. In an embodiment, the threshold amount of time may be determined based on at least a determination of the associated requestor's historical data. For example, if the particular requestor had been previously reassigned in the manner illustrated in FIG. 2C, then of that number of times, it may be determined which times the requestor cancelled their request upon being reassigned, and the average change (among other potential measures) in ETA associated with those times. Similarly, it may be determined which times the requestor did not cancel the reassigned request, and an average change (among other potential measures) in ETA associated with those times. Based on the average changes in ETA (or minimum/maximum changes, etc.), a tolerance for a particular (or average) requestor may be determined and utilized as the threshold amount of time added to an ETA.

According to an embodiment, a determination is made (e.g., during the request matching time period) regarding an ETA of a reassigned driver. For example, if a provider is reassigned to a new request, the ETA to the new request should be within an upper bound in order to ensure that the provider does not cancel; for example, if the new ETA is 30 seconds longer. In an embodiment, an ETA of the initial provider 204A being reassigned to the new request 222 is determined to be less than or equal to the ETA of the initial provider 204A's assignment to the initial request 202, plus a threshold amount of time.

According to an embodiment, requestors (associated with a request) and providers may be assigned a particular type. For example, one type of requestor may be a requestor who has not been assigned a driver. Another type of requestor is a requestor who has been assigned a provider who is at least x seconds away (e.g., the ETA is at least x seconds). A type of provider may be a provider without a current requestor. Another type of provider may be a provider who is dispatched to a requestor and is at least y seconds away from the requestor (e.g., the ETA is at least y seconds).

Figure 3A:
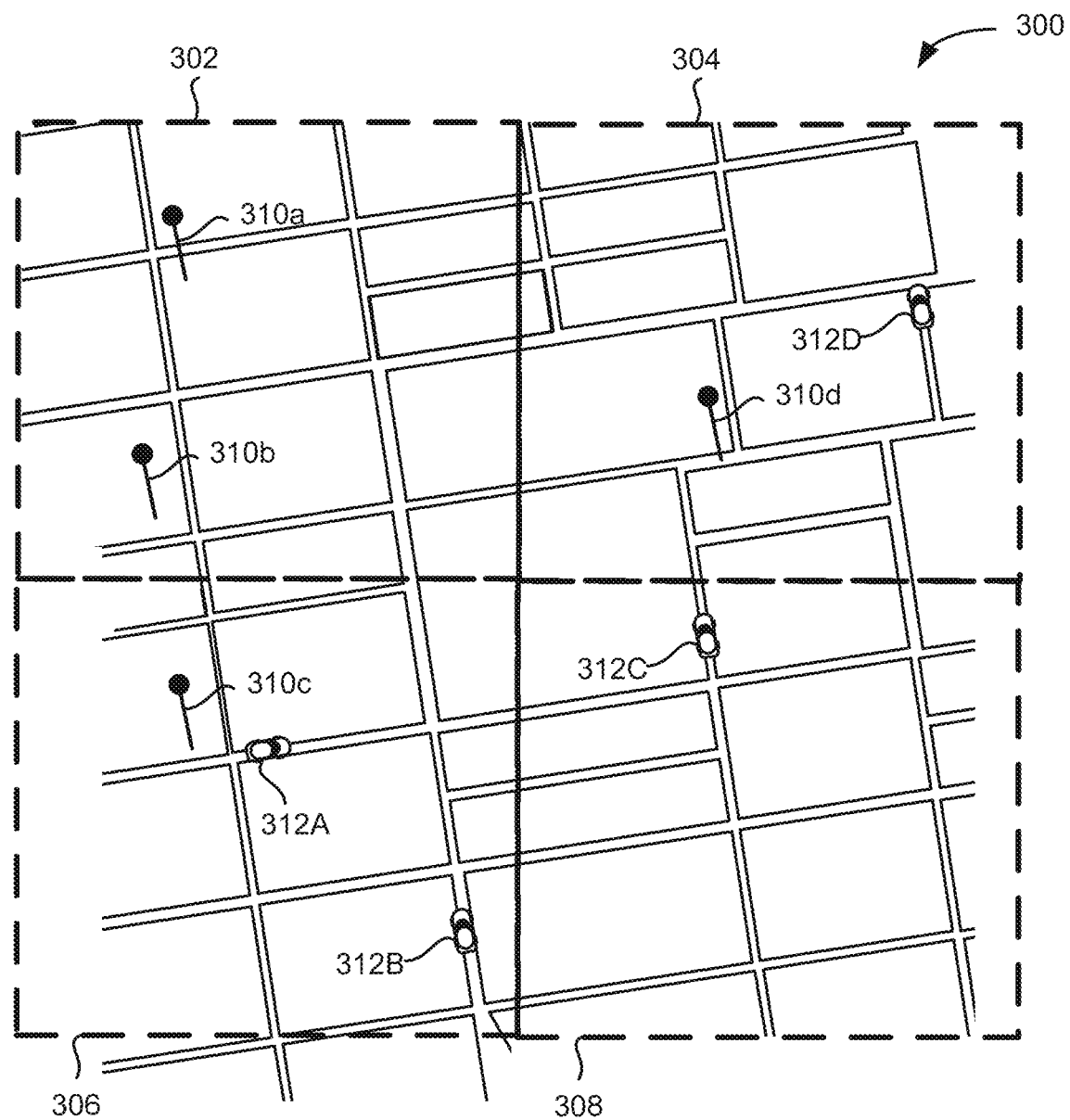
FIGS. 3A-3C illustrate example approaches for dynamically reassigning transportation requests by a dynamic transportation matching system, in accordance with an embodiment of the present techniques.
Figure 3B:
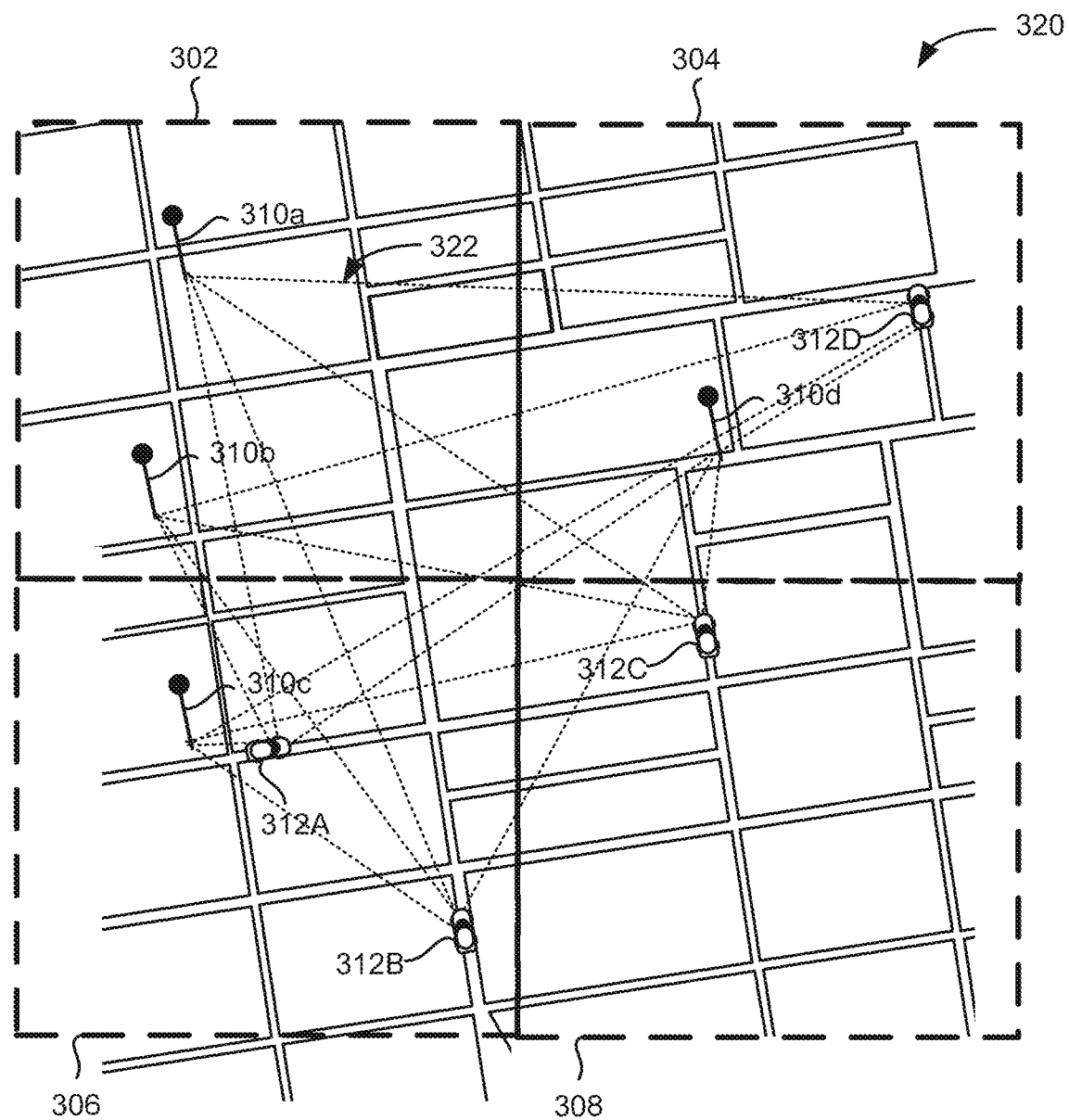
Figure 3C:
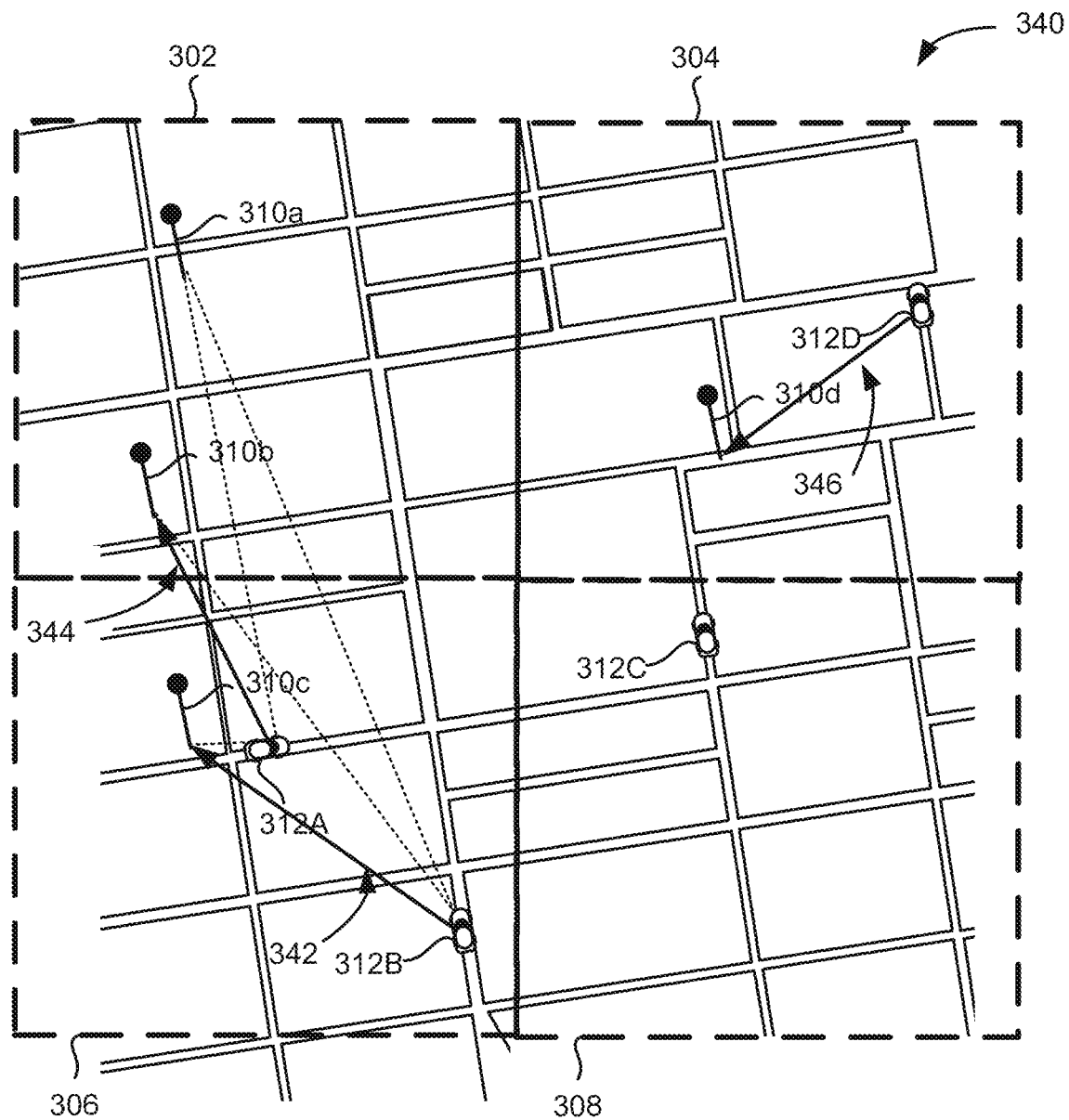

FIGS. 3A-3C illustrate example approaches for dynamically reassigning transportation requests by a dynamic transportation matching system, in accordance with an embodiment of the present techniques. In the example 300 of FIG. 3A, there are four geohashes 302-308 illustrated along with four transport requests 310a-310d, and four providers 312A-312D.

In the example 320 of FIG. 3B, a number of potential assignments 322 (e.g., edges) between each request 310a-310d and each provider 312A-312D are illustrated. As discussed herein, while evaluating each potential assignment is feasible for a limited set of requests and providers (e.g., as illustrated in FIGS. 3A-3C), determining a limited subset of requests and providers may be utilized to reduce a complexity of reassignment evaluations.

In the example 340 of FIG. 3C, a determination has been made that two geohashes 302, 306 are associated with each other (e.g., as described earlier herein), while the other two geohashes 304, 308 are not associated with each other. As a result, the potential assignments (e.g., edges) between the providers 312C-312D in the unrelated geohashes 304, 308 may be dropped. For example, the providers 312C-312D in the unrelated geohashes 304, 308 will not be assigned (or reassigned) to requests in the other geohashes 302, 306, and the request 310d in the unrelated geohash 304 will not be assigned to any providers 312A-312B in the other geohashes 302, 306. As a result, the set of potential assignments (e.g., edges) has been reduced to a manageable number, and actual assignments 342, 344 are made with respect to the remaining potential assignments.

Figure 4A:
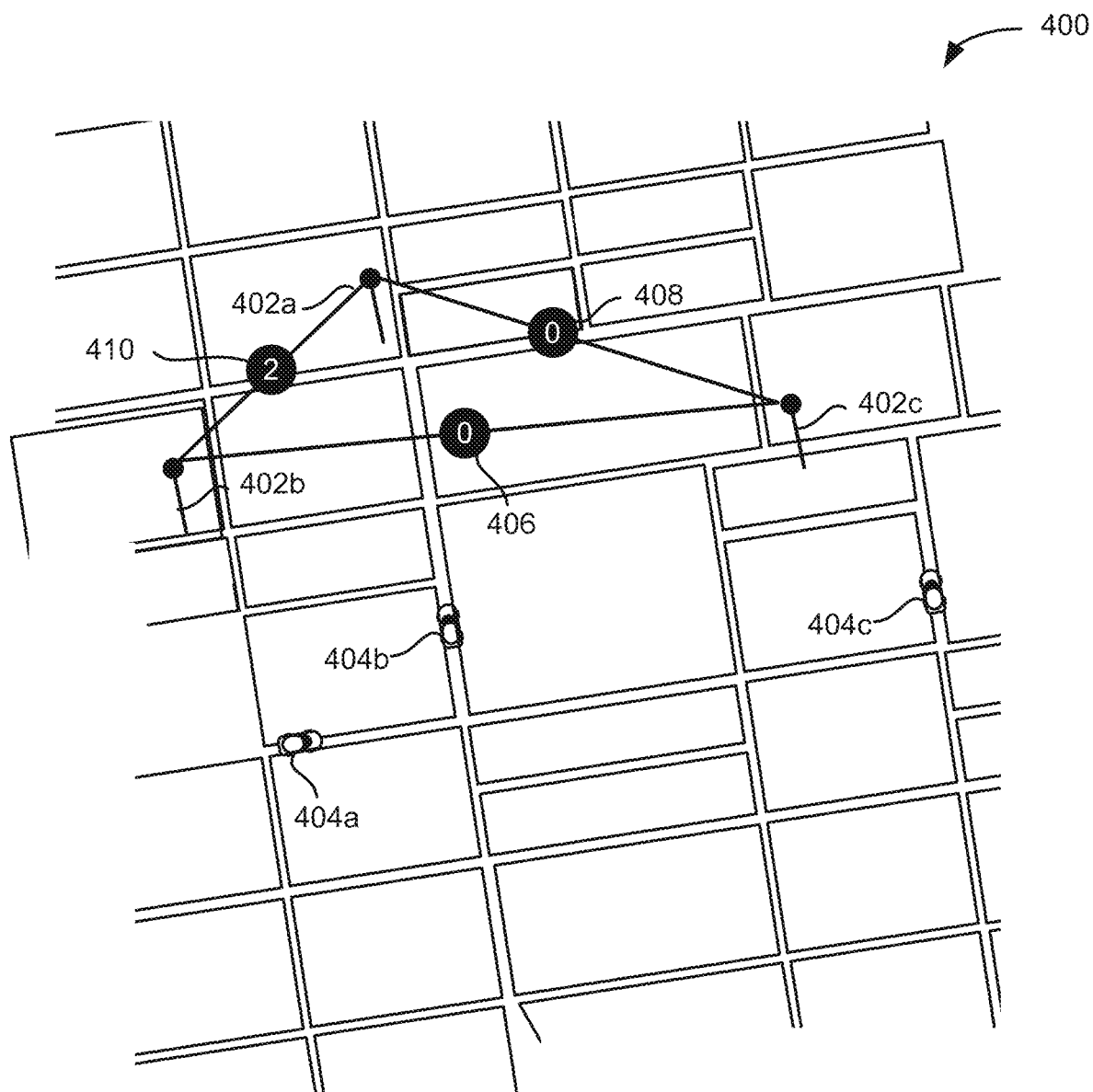
FIGS. 4A-4B illustrate example approaches for identifying optimized geographical boundaries dynamically reassigning transportation requests by a dynamic transportation matching system, in accordance with an embodiment of the present techniques.
Figure 4B:
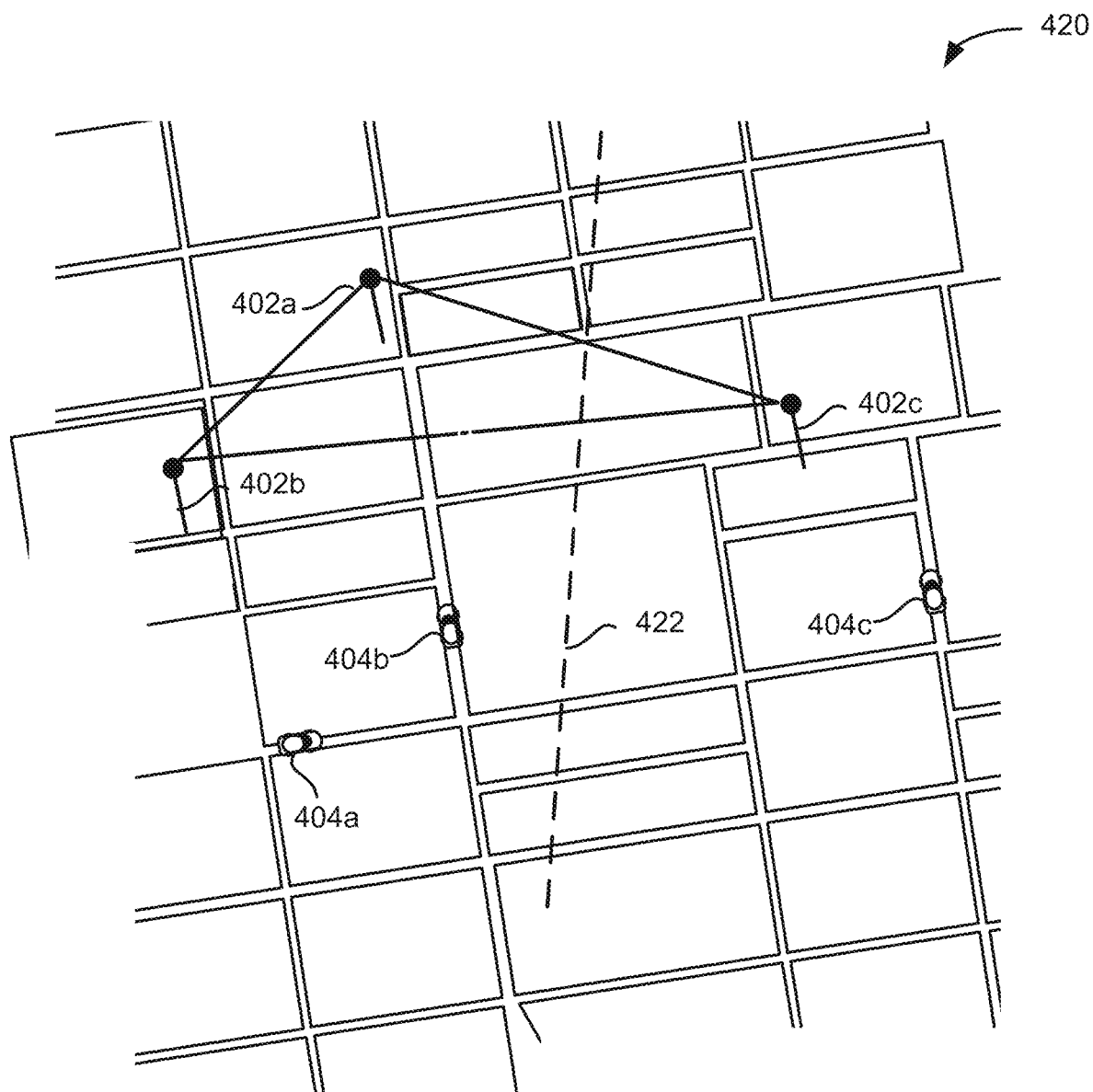

FIGS. 4A-4B illustrate example approaches for identifying optimized geographical boundaries dynamically reassigning transportation requests by a dynamic transportation matching system, in accordance with an embodiment of the present techniques. In the example 400 of FIG. 4A, a geographical location is illustrated, with three requests 402a-402c and three providers 404a-404c. According to an embodiment, a relationship between each pair of requests 402a-402c (e.g., edges in an undirected graph, where the requests are nodes) is determined, and a number of providers 404a-404c indicated within a request matching time period as being available for assignment to each pair of requests 402a-402c is determined and associated 406-410 with each request pair (e.g., edge).

In the example 420 of FIG. 4B, a virtual geographic boundary 422 is drawn that intersects edges between one or more pairs of requests 402a-402c; for example, a dynamic division of regions based on the edges between pairs of requests, with a weight assigned to the edges that corresponds to a number of providers overlapping between the two requests; e.g., how many providers are eligible and available to be assigned to both of the pair of requests. The virtual geographic boundary 422 is drawn such that edges crossed by the virtual geographic boundary 422 have a minimized total weight. For example, in the example of FIG. 4B, the virtual geographic boundary 422 intersects an edge 408 with zero overlapping providers 404a-404c and another edge 406 with zero overlapping providers 404a-404c, while the edge 410 with two overlapping providers 404a-404c is not intersected by the virtual geographic boundary 422, thereby separating a region with the two requests 402a, 402b with overlapping providers 404a-404c and a region with the other request 402c.

According to an embodiment, the virtual geographic boundary allows the geographic location to be divided into areas that are disconnected or loosely connected. For example, to divide a geographic location so that discrete areas may be "solved" with regard to assignments and reassignments of requests and providers, for example.

Figure 5:
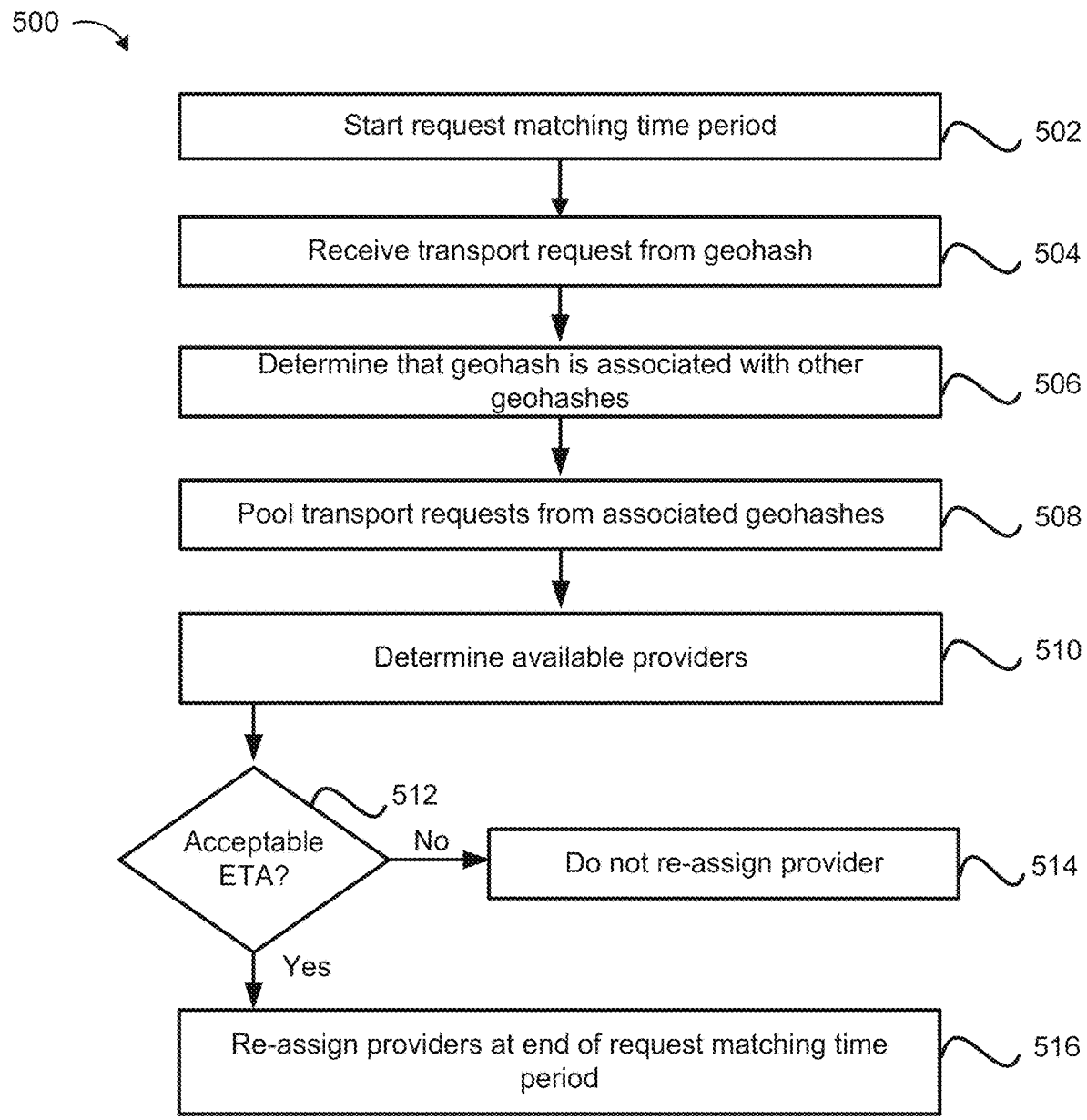
FIG. 5 illustrates an exemplary flow diagram of a method dynamically reassigning transportation requests by a dynamic transportation matching system, in accordance with an embodiment of the present techniques.

FIG. 5 illustrates an exemplary flow diagram of a method dynamically assigning and/or reassigning transportation requests by a dynamic transportation matching system, in accordance with an embodiment of the present techniques. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

At step 502, a request matching time period begins. For example, the time period may be a two-second interval that repeats every two seconds. In other embodiments, the request matching time period may be a dynamically-determined interval, such as being based at least on current supply and demand in one or more geohashes. While the request matching time period in one embodiment receives and pools some or all transport requests that are received by the dynamic transportation matching system during the request matching time period, there may be transport requests received prior to the request matching time period that are dynamically reassigned at the end of the request matching time period. For example, as discussed earlier with regard to constraints that are placed on transport requests that can be reassigned. In an embodiment, the request matching time period is used to dynamically assign and/or reassign all transport requests that are eligible for assignment (e.g., the "pool" of requests) at the end of the request matching time period. In an embodiment, a newly-received transport request may be evaluated for assignment at the end of one request matching time period and evaluated for reassignment in numerous subsequent request matching time periods, until the request reaches a point where it is no longer eligible to be included in the "pool" of requests (e.g., the provider is within x seconds of arriving for the request, etc.).

In step 504, a new transport request is received at the dynamic transportation matching system from a particular geohash. For example, a geographical area or location served by a dynamic transportation matching system may comprise a set of geohashes of varying sizes (e.g., at geohash 6, geohash 8, etc.), and a request when received includes a location that can be correlated to one of the geohashes.

In step 506, it is determined whether the geohash associated with the request is associated with one or more of the other geohashes. For example, as described earlier, a determination based on supply and demand, forecasted increases in requests, etc. may be used to determine whether a provider in a particular geohash is eligible to be matched (e.g., assigned) to a request from another geohash. For example, if the current request is from geohash 1, then a determination is made whether geohashes 2-7 are associated with geohash 1. If only geohash 2 is associated with geohash 1, then a number of potential analyses regarding providers can be reduced, as in an embodiment, only providers with a current location in geohashes 1 or 2 will be evaluated for potential assignment or reassignment to the current request.

In step 508, the current request is "pooled" with other requests received during the current request matching time period. In an embodiment, instead of being immediately matched with a provider, a request will be aggregated with other requests arriving during the current request matching time period, as well as with previous requests eligible for reassignment.

In step 510, eligible providers that are available to be assigned or reassigned to the pooled requests are determined. For example, only from associated geohashes.

In step 512, a determination is made regarding acceptable ETA modifications as a result of an assignment and/or reassignment of a request and/or provider. For example, in an embodiment, if a requestor has already been assigned a provider for her request, and as a result of the request matching time period the request is being evaluated for reassignment, then various constraints may be evaluated. For example, the request may not be eligible for reassignment (e.g., may be removed from the "pool" of requests, either during the request matching time period or at its completion, such as when matching occurs in one embodiment) because no available provider for the reassignment is determined to have an ETA to the requestor within a threshold amount of time, as discussed earlier. In an embodiment, a provider may not be eligible for reassignment to a request because the provider has already been reassigned a threshold number of times, or because an ETA for a reassigned request is greater than a threshold amount over the provider's current ETA to their current request.

At step 514, if the ETA for an assignment/reassignment is unacceptable (e.g., fails one or more constraint evaluations), then a provider is not assigned or reassigned to the current request, and another provider is evaluated. In an embodiment, the process of evaluating the entire set of eligible providers in such a manner is performed within extremely small periods of time and initiated at the end of the request matching time period.

At step 516, if the ETA is acceptable, then the provider currently being evaluated for an ETA to the request is assigned or reassigned to the request. For example, a provider having been assigned to a request during a previous request matching time period may be reassigned to the current request illustrated in FIG. 5, and the provider's previously assigned request may then be pooled with other requests in the subsequent request matching time period, with various constraints applied to it. In an embodiment, one or more previously-assigned requests may not be pooled subsequently; for example, according to a customer-specific parameter, etc. In an embodiment, a previously-assigned request is guaranteed a new provider when its original provided is reassigned. In an embodiment, there may be other matches involving the same provider or request. For example, at step 516, the potential match is saved (e.g., along with other potential matches in a set of saved potential matches), and once the request matching time period ends, a subset of matches from the set of saved potential matches is assigned or reassigned, such as a set of saved potential matches that causes one or more certain criteria to be met (e.g., a set that minimizes a sum of their ETAs along with a penalty for unmatched requestors, etc.)

Figure 6:
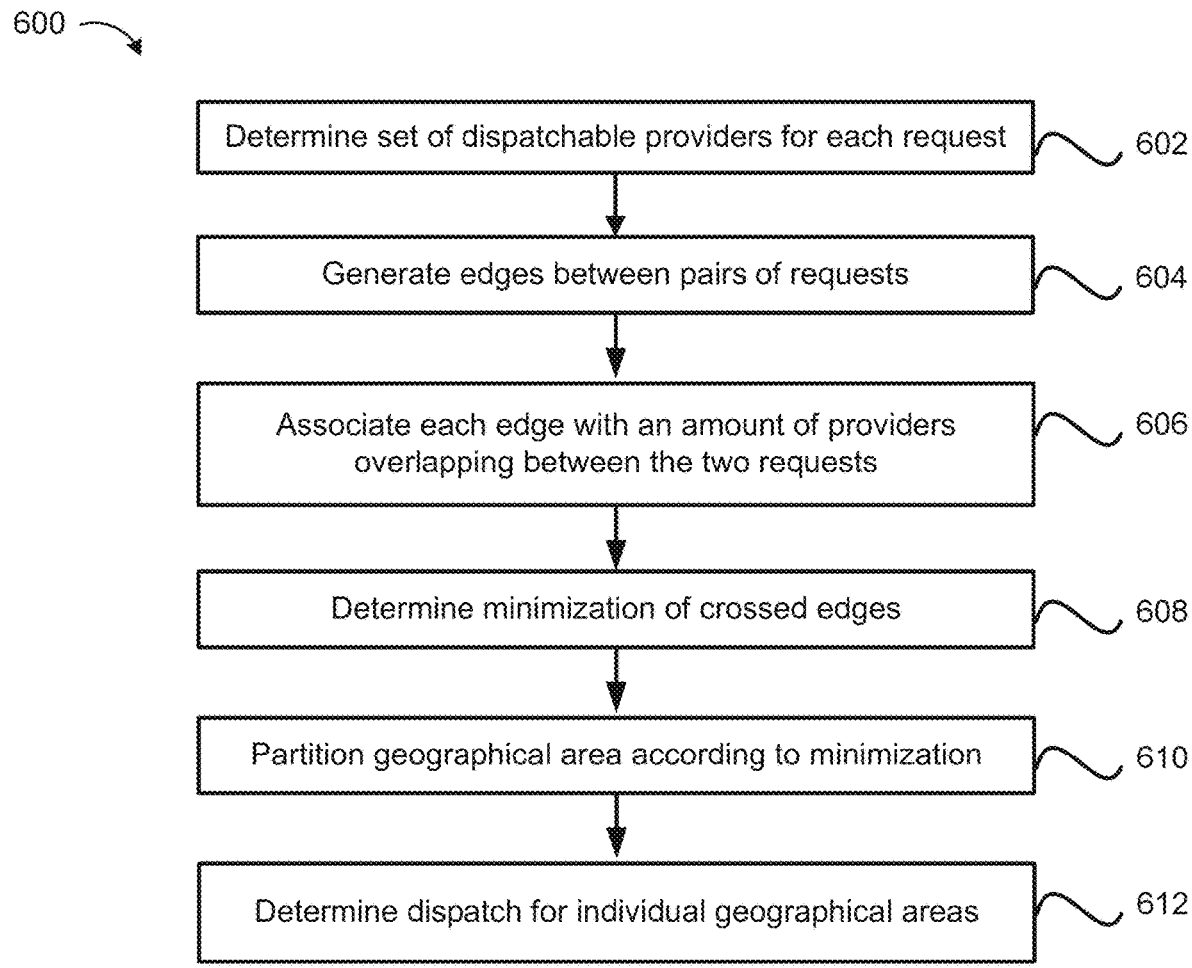
FIG. 6 illustrates an exemplary flow diagram of a method for identifying optimized geographical boundaries dynamically reassigning transportation requests by a dynamic transportation matching system, in accordance with an embodiment of the present techniques.

FIG. 6 illustrates an exemplary flow diagram 600 of a method for using geohash-related prior transport data as part of an approach for predicting locations, in accordance with an embodiment of the present techniques. For example, a geographical location may be logically divided into multiple sub-regions (e.g., pools of requests) that are evaluated independently. This logical region boundary generation may be dynamic, in that the region boundaries can change in real-time as various factors such as supply and demand change; for example, in an embodiment, one or more logical boundaries may be generated and/or modified during each or a subset of the request matching time periods. For example, a pool of requests may be divided into multiple non-overlapping sub-pools, with each pool being independently "solved." The sub-pools may or may not be geohash-related. In addition to a pooling of requests, providers may also be assigned to one or more pools. For example, while a provider may be eligible for assignment to a request from one pool and another request from a separate pool, in an embodiment, the provider may then be assigned to a single pool from which one of the requests is associated.

At step 602, a set of dispatchable (e.g., eligible for matching) providers for each request in a geographical area is determined. For example, there may be ten requests and ten providers in an area. For each request, it is determined which of the ten providers is eligible to be assigned to the request.

At step 604, an "edge" is created between one or more pairs of requests from requestors. For example, in an embodiment, each request may be represented as a node in an undirected graph data structure, and a relationship (e.g., an edge) is created between each pair of requests, although other types of logical relationships denoting associated requests is contemplated. For example, if there are three requests, then there are three pairs of requests and three edges. Request one to request two, request two to request three, and request one to request three.

At step 606, each edge or relationship is associated with a value (e.g., a weight) that in an embodiment corresponds to an amount of eligible providers that overlap between the two requests in the pair. For example, if request one has three eligible providers and request two has two eligible providers, it is determined which of those providers are shared by request one and request two. If one provider is eligible to be assigned to both request one and request two, then a value of one is assigned to the relationship (e.g., a weight of one is assigned to the edge between request one and request two).

At step 608, a minimization of edge weights crossed by a potential logical boundary is determined. For example, if there are fifty edges each with an associated weight, then various permutations of a logical boundary that crosses one or more of the edges is determined until a potential boundary is found that crosses edges with the fewest total value. In an embodiment, various thresholds may be used to ensure that boundaries are of appropriate size, contain enough providers and/or requests, cross enough edges, etc. In this manner, one or more resulting sub-graphs from the partitioning can be reduced in size enough to be more efficiently solved.

At step 610, the geographical area is logically partitioned according to the minimization, as well as any constraints and/or requirements. For example, a geographical area may be represented by map data, and the map data being modified to represent each individual logical partition as a separate region.

At step 612, a dispatch is determined for each individual logical region. For example, during a request matching time period, if a provider from one region is assigned to a request from another region, the provider may then be assigned to that pool for a period of time (e.g., if the provider has a conflict by being assigned to requests from separate regions). In an embodiment, a dispatch may be determined for each individual logical pool of requests. For example, during a request matching time period, a provider is considered by at most one pool of requests exclusively, although other values for the number of pools are envisioned as well.

Figure 7:
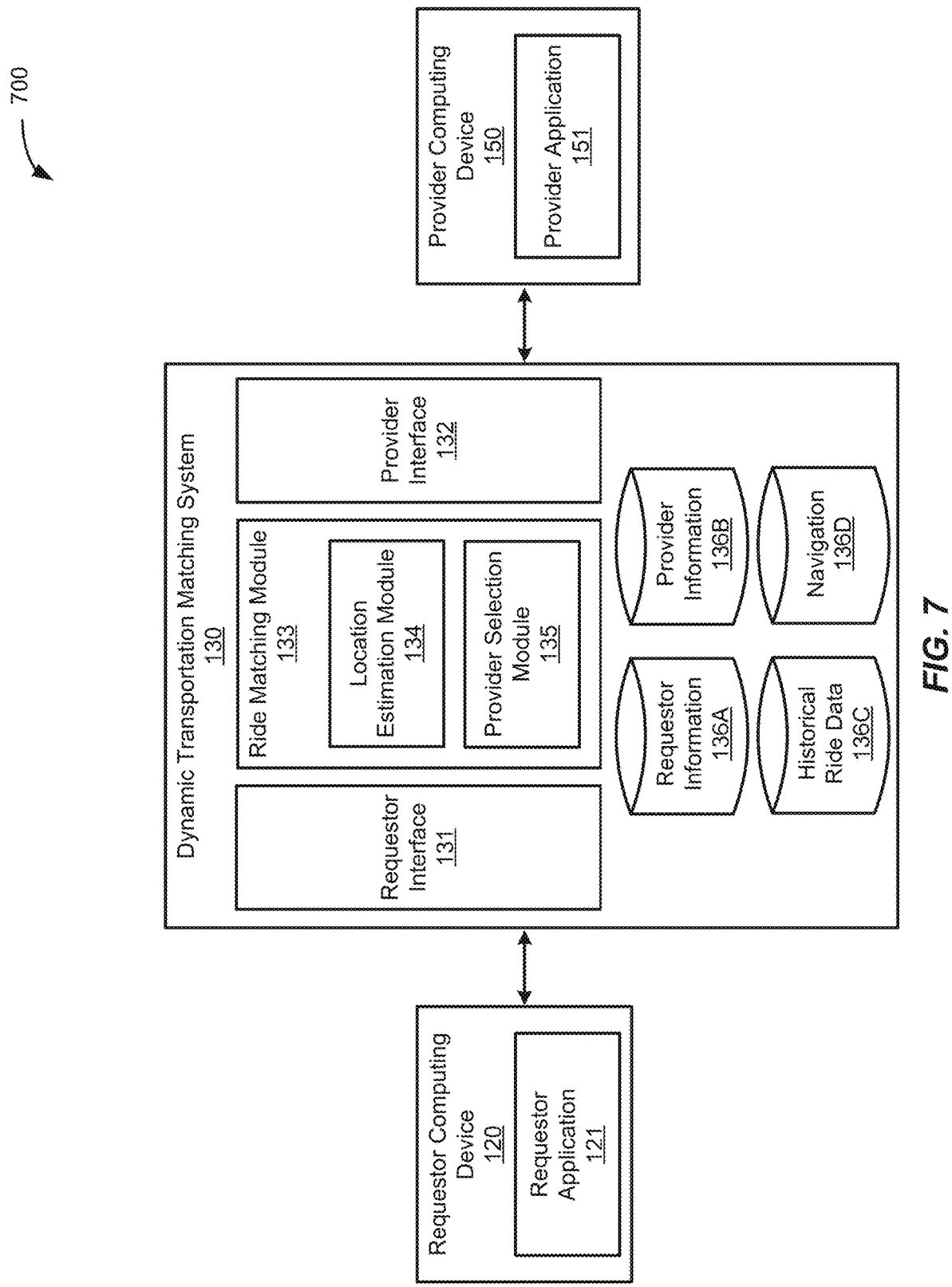
FIG. 7 illustrates an example block diagram of a dynamic transportation matching system, in accordance with embodiments of the present techniques.

FIG. 7 illustrates an example block diagram 700 of a dynamic transportation matching system 130, in accordance with an embodiment of the present techniques. As described above, the dynamic transportation matching system 130 may identify and facilitate request matching from requestors 110 associated with requestor computing devices 120 with available providers 140 associated with provider computing devices 150. The dynamic transportation matching system 130 may include a requestor interface 131, a provider interface 132, and a ride matching module 133 including a location estimation module 134, and a provider selection module 135. In an embodiment, the dynamic transportation matching system 130 may further comprise an Admin Interface (not illustrated) accessible by an Admin Computing Device Interface (not illustrated) and an Admin Application Interface (not illustrated) for monitoring and reviewing the dynamic transportation matching system 130. The dynamic transportation matching system 130 may also include a requestor information data store 136A, a provider information data store 136B, a historical ride data store 136C, and a navigation data store 136D which may be used by any of the modules of the dynamic transportation matching system 130 to obtain information in order to perform the functionality of the corresponding module. The dynamic transportation matching system 130 may be configured to communicate with one or more requestor computing devices 120 and one or more provider computing devices 150. Although the dynamic transportation matching system 130 is shown in a single system, the dynamic transportation matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar request and matching functionality. Accordingly, embodiments are not limited to the matching of ride requests and one of ordinary skill would recognize that embodiments could be implemented for any number of different services that have requestors and providers being matched through a network of communicably connected computing devices.

The requestor interface 131 may include any software and/or hardware components configured to send and receive communications and/or other information between the dynamic transportation matching system 130 and one or more of requestor computing devices 120. The requestor interface 131 may be configured to facilitate communication between the dynamic transportation matching system 130 and the requestor application 121 operating on each of one or more of requestor computing devices 120. The requestor interface 131 may be configured to periodically receive ride requests, location information, a request location (also referred to as a "pick-up" location, although in some embodiments, a request location and an actual or target pick-up location are different events), requestor status information, a location of the requestor computing device, progress toward a request location by the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a historical ride data store 136C with the ride request information, including types of instances of prior transport data (e.g., prior request locations, prior actual pickup locations, prior transport start locations, prior transport destinations, and/or prior actual drop-off locations, etc.).

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information, such as locations of instances of prior transport data as described above.

A requestor computing device 120 may include any device that is configured to communicate with a dynamic transportation matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the dynamic transportation matching system 130 and interface with the user (i.e., requestor) of the requestor computing device 120. The requestor application 121 may allow a user to request a current or scheduled ride for that user or, in some embodiments, on behalf of another user, monitor the status of a matched ride, pay for a ride, monitor past rides, perform any other requestor-oriented services related to the dynamic transportation matching system 130, and/or obtain any other requestor-oriented information from the dynamic transportation matching system 130.

The provider interface 132 may include any software and/or hardware configured to send and receive communications and/or other information between the dynamic transportation matching system 130 and one or more of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider computing device location, and/or any other relevant information, including locations of instances of prior transport data as described above.

A provider computing device 150 may include any computing device that is configured to communicate with a dynamic transportation matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the dynamic transportation matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the dynamic transportation matching system 130, and/or obtain any other provider-oriented information from the dynamic transportation matching system 130.

The ride matching module 133 may include a software module that is configured to process ride requests, ride responses, and other communications between requestors and providers of the dynamic transportation matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region.

The ride matching module 133 may include a location estimation module 134 and a provider selection module 135 that are configured to allow the ride matching module to perform efficient matching at target pickup/destination locations using the techniques described herein. For example, when the ride matching module 133 receives the request, the ride matching module 133 may identify available providers in the geographic area around the request location. The ride matching module 133 may use a threshold distance (e.g., 10 miles, 15 miles, etc.), one or more zip codes or other geographic identifiers (e.g., streets, blocks, neighborhoods, city, region, etc.), or any other suitable geographic limitation to identify available providers relevant to a request location. For example, the ride matching module 133 may search the provider information data store 136B to identify any available providers that are located within a certain distance from the request location or have a threshold estimated time of arrival (ETA) to the request location and/or a destination location associated with the request. The ride matching module 133 may also limit the search for available providers to those that meet ride request criteria such that the available provider can serve the request. For example, whether a provider vehicle is a sedan, luxury, SUV, or other type of car, has a particular type of feature or amenity (e.g., car seat, dog friendly, etc.), has a number of available seats (e.g., request for 2 people, etc.), and/or may use any other stored information at the dynamic transportation matching system to limit available providers to those that can serve the request.

Once the ride matching module 133 identifies the available providers in the area, the ride matching module 133 may calculate an estimated travel time for each of the providers from their current location to the request location. As discussed above, the ride matching module 133 may incorporate traffic, weather, road closures, and/or any other conditions that may affect travel time into the estimation. The ride matching module 133 may use historical ride data that is relevant for the time of day, streets and geographic region, as well as stored previous rides over those times, areas, road conditions, and/or any other information to obtain an estimate for the provider to travel from their current location to the request location. For example, the ride matching module 133 may be configured to obtain the location of each of the provider computing devices. The ride matching module 133 may be configured to identify the request location and map navigation routes for each of the providers and the requestor to the request location. The ride matching module 133 may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type, or set of types, of transportation (e.g., driving, biking, sailing, flying, etc.). The ride matching module 133 may map one or more possible routes from the provider location to the request location as well as the alternate request locations and generate an estimated arrival time for each of the potential mapped routes. The ride matching module 133 may select one or more fastest, in expectation or risk-adjusted, and/or most probable routes for each of the providers and the corresponding estimated travel time for each route, or set of routes, as the estimated travel time for the provider. The ride matching module 133 may incorporate current traffic conditions, road closures, weather conditions, provider-specific driving history, and/or any other relevant travel time related information to calculate an estimated arrival time for the provider. The estimated arrival time may also be calculated by taking an average of the arrival time of each of the set of mapped routes, selecting the estimated arrival time for the fastest route, in expectation or risk-adjusted, receiving a selection of one of the potential routes by the provider, identifying the route being taken based on the route being used by the provider, and/or through any other suitable method. If the provider makes a wrong turn and/or follows a different route than that calculated by the ride matching module 133, the ride matching module 133 may obtain the updated location of the provider computing device and recalculate the possible routes and estimated arrival times. As such, the estimated travel times may be updated as travel and road conditions, weather, etc. are updated. Accordingly, the ride matching module 133 may determine a navigation route associated with the request location and an estimated travel time for each of the providers. Further, the estimated time may be determined through any suitable method including taking an average of multiple routes, selecting the fastest route, adding additional cushion time when certainty is low for the estimate of the time, etc. Accordingly, the ride matching module 133 may determine an estimated travel time for each of the available providers in the area that may potentially match the request.

The location estimation module 134 may use locations of instances of prior transport data as described above to estimate a target pickup location. The location estimation module 134 may use instances of prior transport data to estimate a location for a target pickup location that is related to a request location. For example, a requestor may provide a request location in the middle of a building for various reasons; however, the requestor's intent is to be picked up somewhere outside the building, preferably in a location that leads to an efficient journey and allows the requestor and the provider to meet each other without undue delay. The location estimation module may perform techniques to estimate a target pickup location.

The ride matching module 133 may then provide estimated travel times for the providers and the requestor to the provider selection module 135. The provider selection module 135 may obtain the estimated travel times and may select one or more providers that should be matched with the request. Accordingly, the provider selection module 135 may generate a dynamic provider eligibility model that incorporates both the estimated requestor arrival time and the estimated provider arrival times of each of the providers to identify those available providers that are eligible for a match. The provider selection module 135 may then select a subset of the eligible available providers and select one of the providers based on system efficiency, rankings, route, arrival time, and/or any other suitable information that can be used for matching. For example, two available providers may be identified as eligible for a request where one of the providers is traveling away from the request location while the other is traveling toward the request location. The provider selection module 135 may select the provider that is traveling toward the request location because it causes less driving, fewer turns, safer driving, and all the other benefits of allowing providers to maintain their current direction of travel.

Additionally, in some embodiments, the provider selection module 135 may perform available provider prediction to ensure that the best possible match is being made. For instance, the provider selection module 135 may obtain an available provider rate associated with the request location from a historical ride data store 136C that may indicate the historical rate of providers becoming available, for example from dropping off previously matched requestors, signing-in, or diffusion from neighboring geographies, near the request location. For example, some areas may have a high rate of providers coming online during particular times that the dynamic transportation matching system may use to predict available providers near the request location. For requests that have relatively large requestor arrival times outstanding (e.g., 5+ minutes) and a high rate of predicted available providers, the system may delay matching to an eligible provider even if there are multiple providers that are available and eligible for a request in order to ensure that the a more efficient system match does not arise. Additionally, the ride history data store 136C may be consulted for existing rides that have providers that will be dropping off requestors in the area before the requestor arrival time is up. For instance, if a request is received for a busy area where a number of different providers with requestors are dropping off previously matched requestors and/or where new providers are known to become active during the time frame of the requestor arrival time, the provider selection module 135 may delay matching to see if a provider becomes available in the area that is closer than the existing eligible providers for the request. The ride matching module may repeat the process and monitor the status of the available and matched providers in the area along with the progress of the requestor toward the request location to ensure that a well-matched and eligible provider is matched to the request before the requestor arrives at the request location. Accordingly, by tracking and monitoring system activity as well as using estimated arrival times for the providers and requestor over time, the system can more efficiently and effectively match provider resources with requestor resources to ensure the most efficient matching of resources.

The ride matching module 133 may provide the ride request to the provider interface 132 with the provider contact information or provider identifier so that the ride request may be sent to one or more available providers. The ride matching module 133 may send the ride request and/or the information from the ride request to one or more of the selected available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the dynamic transportation matching system 130 indicating whether a ride was accepted and including a provider identifier, a location of the provider, and/or any other suitable information to allow the dynamic transportation matching system 130 to process the response. Alternatively, the provider may ignore the request and after a predetermined period of time, the request may be considered denied and a corresponding ride response message may be sent to the dynamic transportation matching system 130. In some embodiments, no response may be sent unless a ride request is accepted and the ride will be assumed to be denied unless a response is received from the provider. In other embodiments, no response is necessary and the ride may be immediately accepted. An indicator, flag, and/or other information may be passed back to the dynamic transportation matching system to assure the system that the provider computing device received the request.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, an estimated time of arrival for the provider, and/or any other suitable information to allow the requestor and the provider to complete the requested service. The ride matching module 133 may update the historical ride data store 136C with the corresponding matched ride information for the matched ride. Accordingly, the ride matching module may perform more efficient and effective matching of requests with providers.

Figure 8:
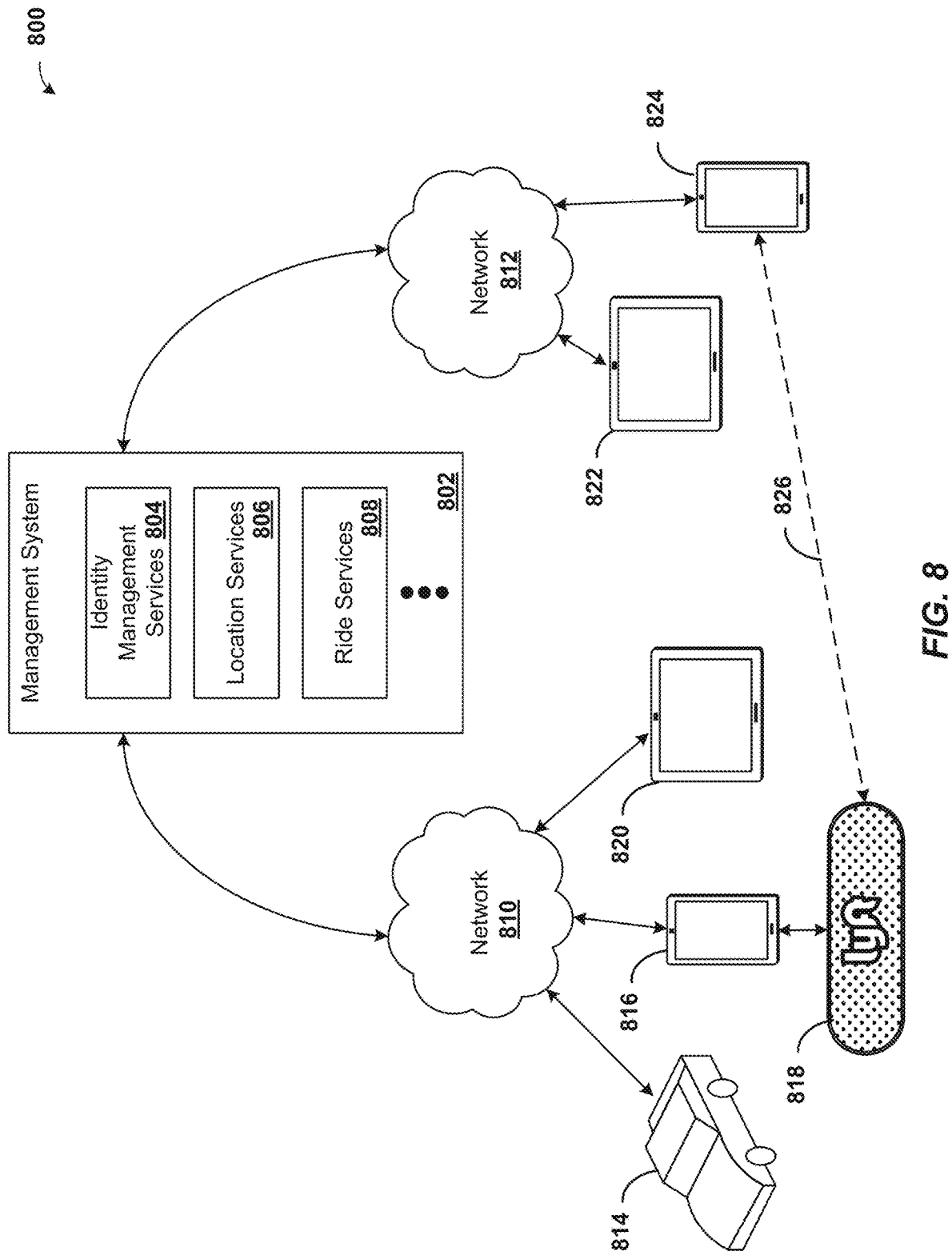
FIG. 8 illustrates an example requestor/provider management environment, in accordance with various embodiments.

FIG. 8 shows a requestor/provider management environment 800, in accordance with various embodiments. As shown in FIG. 8, a management system 802 can be configured to provide various services to requestor and provider devices. Management system 802 can run one or more services or software applications, including identity management services 804, location services 806, ride services 808, or other services. Although three services are shown as being provided by management system 802, more or fewer services may be provided in various implementations. In various embodiments, management system 802 may include one or more general purpose computers, server computers, clustered computing systems, cloud-based computing systems, or any other computing systems or arrangements of computing systems. Management system 802 may be configured to run any or all of the services and/or software applications described with respect to various embodiments of the present techniques described herein. In some embodiments, management system 802 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 804 may include various identity services, such as access management and authorization services for requestors and providers when interacting with management system 802. This may include, e.g., authenticating the identity of providers and determining that the providers are authorized to provide services through management system 802. Similarly, requestors' identities may be authenticated to determine whether the requestor is authorized to receive the requested services through management system 802. Identity management services 804 may also control access to provider and requestor data maintained by management system 802, such as driving and/or ride histories, personal data, or other user data. Location services 806 may include navigation and/or traffic management services and user interfaces, or other location services.

In various embodiments, ride services 808 may include ride matching and management services to connect a requestor to a provider. Ride services 808 may include a user interface and or may receive data from requestors and providers through applications executing on their respective devices. Ride services 808 may, e.g., confirm the identity of requestors and providers using identity management services 804, and determine that each user is authorized for the requested ride service. In some embodiments, ride services 808 can identify an appropriate provider using a location obtained from a requestor and location services 806 to identify, e.g., a closest provider. As such, ride services 808 can manage the distribution and allocation of provider and requestor resources, consistent with embodiments described herein.

Management system 802 can connect to various devices through network 810 and 812. Networks 810, 812 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 810, 812 can include local area networks (LAN), such as Ethernet, Token-Ring or other LANs. Networks 810, 812 can include a wide-area network and/or the Internet. In some embodiments, networks 810, 812 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 810, 812 can include a mobile network, such as a mobile telephone network, cellular network, satellite network, or other mobile network. Networks 810, 812 may be the same as communication network 170 in FIG. 1. In some embodiments, networks 810, 812 may each include a combination of networks described herein or other networks as are known to one of ordinary skill in the art.

Users may then utilize one or more services provided by management system 802 using applications executing on provider and requestor devices. As shown in FIG. 8, provider computing devices 814, 816, 818, and/or 820 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 810, 812. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 814 can include a vehicle-integrated computing device, such as a vehicle navigation system, or other computing device integrated with the vehicle itself.

In some embodiments, provider computing device 818 can include a provider communication device configured to communicate with users, such as drivers, passengers, pedestrians, and other users. In some embodiments, provider communication device 818 can communicate directly with management system 802 or through another provider computing device, such as provider computing device 816. In some embodiments, a requestor computing device can communicate 826 directly with provider communication device 818 over a peer-to-peer connection, Bluetooth connection, NFC connection, ad hoc wireless network, or any other communication channel or connection. Although particular devices are shown as communicating with management system 802 over networks 810 and 812, in various embodiments, management system 802 can expose an interface, such as an application programming interface (API) or service provider interface (SPI) to enable various third parties which may serve as an intermediary between end users and management system 802.

Although requestor/provider management environment 800 is shown with four provider devices and two requestor devices, any number of devices may be supported. The various components shown and described herein may be implemented in hardware, firmware, software, or combinations thereof. Although one embodiment of a requestor/provider management environment is depicted in FIG. 8, this is merely one implementation and not meant to be limiting.

Figure 9:
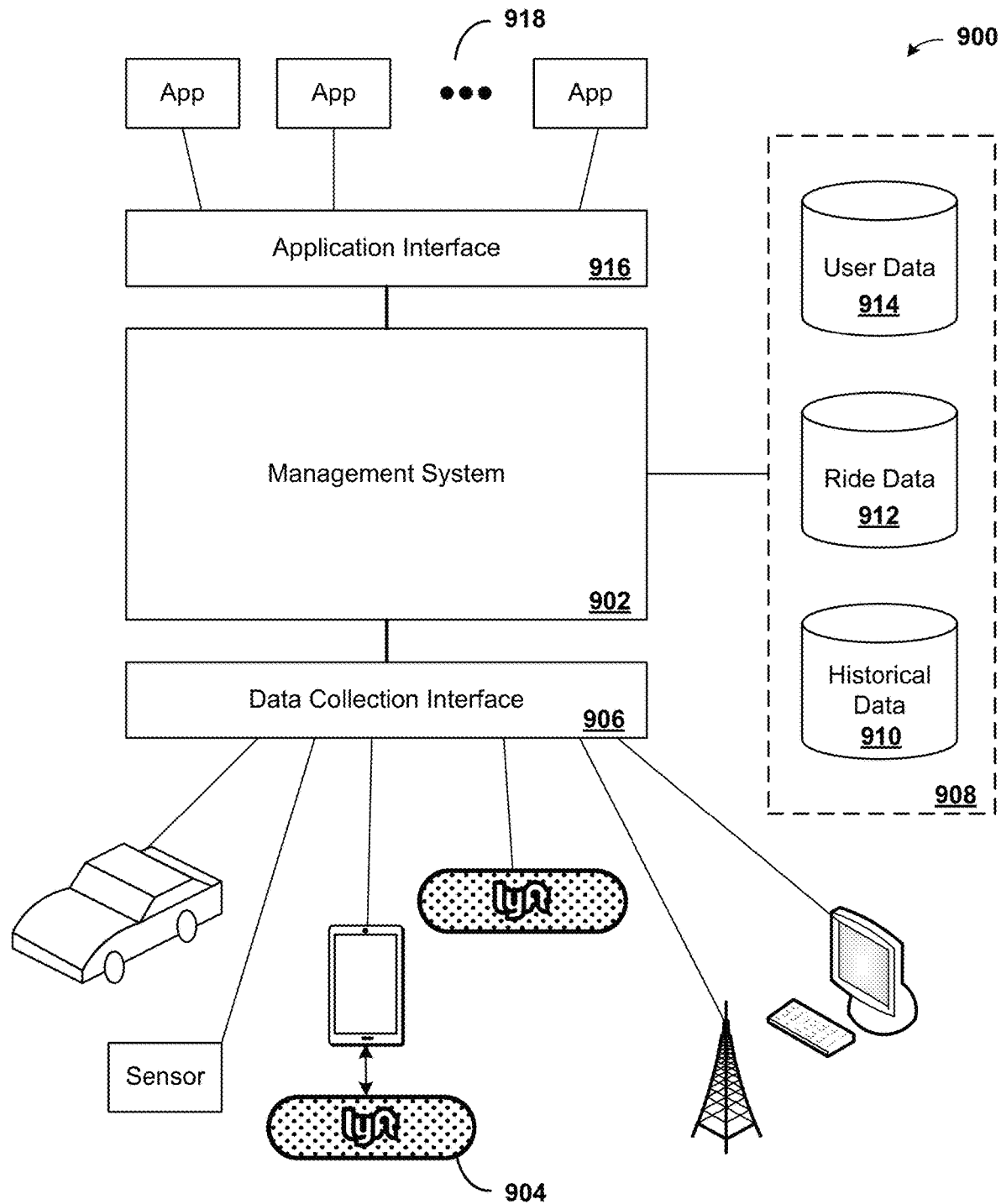
FIG. 9 illustrates an example data collection and application management system, in accordance with various embodiments.

FIG. 9 shows a data collection and application management environment 900, in accordance with various embodiments. As shown in FIG. 9, management system 902 may be configured to collect data from various data collection devices 904 through a data collection interface 906. As discussed above, management system 902 may include one or more computers and/or servers or any combination thereof. Data collection devices 904 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 906 can include, e.g., an extensible device framework configured to support interfaces for each data collection device. In various embodiments, data collection interface 906 can be extended to support new data collection devices as they are released and/or to update existing interfaces to support changes to existing data collection devices. In various embodiments, data collection devices may communicate with data collection interface 906 over one or more networks. The networks may include any network or communication protocol as would be recognized by one of ordinary skill in the art, including those networks discussed above.

As shown in FIG. 9, data received from data collection devices 904 can be stored in data store 908. Data store 908 can include one or more data stores, such as databases, object storage systems and services, cloud-based storage services, and other data stores. For example, various data stores may be implemented on a non-transitory storage medium accessible to management system 902, such as historical data store 910, ride data store 912, and user data store 914. Data stores 908 can be local to management system 902, or remote and accessible over a network, such as those networks discussed above or a storage-area network or other networked storage system. In various embodiments, historical data 910 may include historical traffic data, weather data, request data, road condition data, or any other data for a given region or regions received from various data collection devices. Ride data 912 may include route data, request data, timing data, and other ride related data, in aggregate and/or by requestor or provider. User data 914 may include user account data, preferences, location history, and other user-specific data. Although particular data stores are shown, any data collected and/or stored according to the various embodiments described herein may be stored in data stores 908.

As shown in FIG. 9, an application interface 916 can be provided by management system 902 to enable various apps 918 to access data and/or services available through management system 902. Apps 918 can run on various user devices (including provider and requestor computing devices, such as those discussed above) and/or may include cloud-based or other distributed apps configured to run across various devices (e.g., computers, servers, or combinations thereof). Apps 918 may include, e.g., aggregation and/or reporting apps which may utilize data 908 to provide various services (e.g., third-party ride request and management apps). In various embodiments, application interface 916 can include an API and/or SPI enabling third party development of apps 918. In some embodiments, application interface 916 may include a web interface, enabling web-based access to data 908 and/or services provided by management system 902. In various embodiments, apps 918 may run on devices configured to communicate with application interface 916 over one or more networks. The networks may include any network or communication protocol as would be recognized by one of ordinary skill in the art, including those networks discussed above, in accordance with an embodiment of the present disclosure.

Although a particular implementation of environment 900 is shown in FIG. 9, this is for illustration purposes only and not intended to be limited. In some embodiments, environment 900 may include fewer or more components, as would be recognized by one or ordinary skill in the art.

FIGS. 10A-10C show an example provider communication device 1000 in accordance with various embodiments. As shown in FIG. 10A, a front view 1002 of provider communication device 1000 shows a front display 1004. In some embodiments, front display 1004 may include a secondary region or separate display 1006. As shown in FIG. 10A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1004 can be configured to show colors, patterns, color patterns, or other identifying information to requestors and other users external to a provider vehicle. In some embodiments, the secondary region or separate display 1006 may be configured to display the same, or contrasting, information as front display 1004.

As shown in FIG. 10B, a rear view 1008 of provider communication device 1000 shows a rear display 1010. Rear display 1010, as with front display 1004, rear display 1010 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1010 may be configured to provide information to users external to the provider vehicle who are located behind the provider vehicle. As further shown in FIG. 10B, provider communication device may include a power button 1012 or other switch which can be used to turn on or off the provider communication device. In various embodiments, power button 1012 may be a hardware button or switch that physically controls whether power is provided to provider communication device 1000. Alternatively, power button 1012 may be a soft button that initiates a startup/shutdown procedure managed by software and/or firmware instructions. In some embodiments, provider communication device 1000 may not include a power button 1012. Additionally, provider communication device may include one or more light features 1014 (such as one or more LEDs or other light sources) configured to illuminate areas adjacent to the provider communication device 1000. In some embodiments, provider communication device 1000 can include a connector to enable a provider computing device to be connected to the provider communication device 1000. In some embodiments, power may be provided to the provider communication device through connector 1016.

FIG. 10C shows a block diagram of provider computing device 1000. As shown in FIG. 10C, provider communication device can include a processor 1018. Processor 1018 can control information displayed on rear display 1010 and front display 1004. As noted, each display can display information to different users, depending on the positioning of the users and the provider communication device. In some embodiments, display data 1020 can include stored display patterns, sequences, colors, text, or other data to be displayed on the front and/or rear display. In some embodiments, display data 1020 can be a buffer, storing display data as it is received from a connected provider computing device. In some embodiments, display data 1020 can include a hard disk drive, solid state drive, memory, or other storage device including information from a management system. In some embodiments, lighting controller 1022 can manage the colors and/or other lighting displayed by light features 1014. In some embodiments, communication component 1024 can manage networking or other communication between the provider communication device 1000 and one or more networking components or other computing devices. In various embodiments, communication component 1024 can be configured to communicate over Wi-Fi, Bluetooth, NFC, RF, or any other wired or wireless communication network or protocol. In some embodiments, provider communication device 1000 can include an input/output system 1026 configured to provide output in addition to that provided through the displays and/or to receive inputs from users. For example, I/O system 1026 can include an image capture device configured to recognize motion or gesture-based inputs from a user. Additionally, or alternatively, I/O system 1026 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 11:
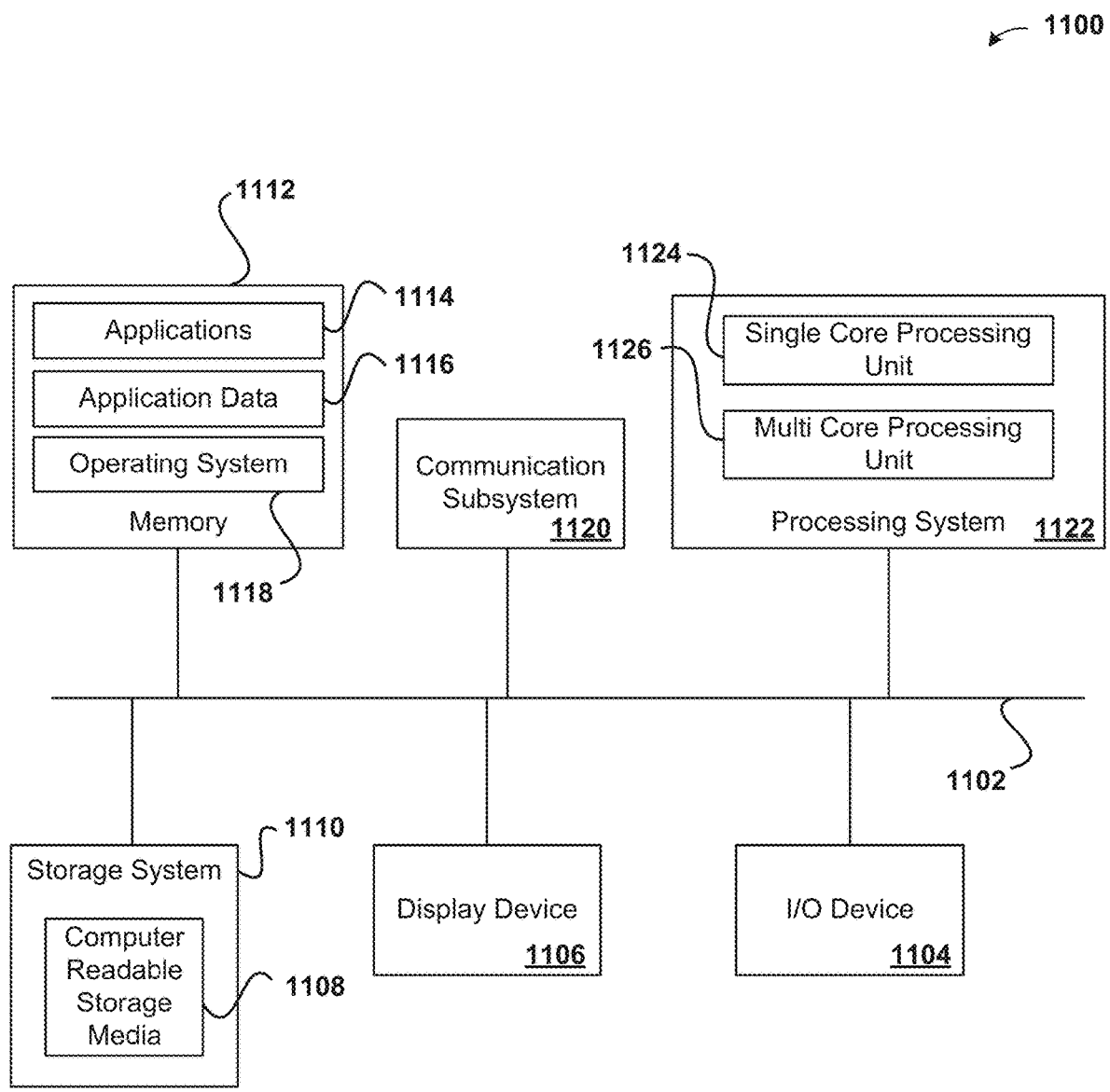
FIG. 11 illustrates an example computer system, in accordance with various embodiments.

FIG. 11 shows an example computer system 1100, in accordance with various embodiments. In various embodiments, computer system 1100 may be used to implement any of the systems, devices, or methods described herein. In some embodiments, computer system 1100 may correspond to any of the various devices described herein, including, but not limited, to mobile devices, tablet computing devices, wearable devices, personal or laptop computers, vehicle-based computing devices, or other devices or systems described herein. As shown in FIG. 11, computer system 1100 can include various subsystems connected by a bus 1102. The subsystems may include an I/O device subsystem 1104, a display device subsystem 1106, and a storage subsystem 1110 including one or more computer readable storage media 1108. The subsystems may also include a memory subsystem 1112, a communication subsystem 1120, and a processing subsystem 1122.

In system 1100, bus 1102 facilitates communication between the various subsystems. Although a single bus 1102 is shown, alternative bus configurations may also be used. Bus 1102 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1102 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1104 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1104 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1100 may include a display device subsystem 1106. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1106 may include a controller and/or interface for controlling and/or communicating with an external display, such as any of the above-mentioned display technologies.

As shown in FIG. 11, system 1100 may include storage subsystem 1110 including various computer readable storage media 1108, such as hard disk drives, solid state drives (including RAM-based and/or flash-based SSDs), or other storage devices. In various embodiments, computer readable storage media 1108 can be configured to store software, including programs, code, or other instructions, that is executable by a processor to provide functionality described herein. In some embodiments, storage system 1110 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1110 can include a media reader, card reader, or other storage interface to communicate with one or more external and/or removable storage devices. In various embodiments, computer readable storage media 1108 can include any appropriate storage medium or combination of storage media. For example, computer readable storage media 1108 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include any medium through which data can be sent and/or received.

Memory subsystem 1112 can include various types of memory, including RAM, ROM, flash memory, or other memory. Memory 1112 can include SRAM (static RAM) or DRAM (dynamic RAM). In some embodiments, memory 1112 can include a BIOS (basic input/output system) or other firmware configured to manage initialization of various components during, e.g., startup. As shown in FIG. 11, memory 1112 can include applications 1114 and application data 1110. Applications 1114 may include programs, code, or other instructions, that can be executed by a processor. Applications 1114 can include various applications such as browser clients, location management applications, ride management applications, data management applications, and any other application. Application data 1116 can include any data produced and/or consumed by applications 1114. Memory 1112 can additionally include operating system 1118, such as macOS®, Windows®, Linux®, various UNIX® or UNIX- or Linux-based operating systems, or other operating systems.

System 1100 can also include a communication subsystem 1120 configured to facilitate communication between system 1100 and various external computer systems and/or networks (such as the Internet, a local area network (LAN), a wide area network (WAN), a mobile network, or any other network). Communication subsystem 1120 can include hardware and/or software to enable communication over various wired (such as Ethernet or other wired communication technology) or wireless communication channels, such as radio transceivers to facilitate communication over wireless networks, mobile or cellular voice and/or data networks, Wi-Fi networks, or other wireless communication networks. For example, the communication network is shown as communication network 170 in FIG. 1. Additionally, or alternatively, communication subsystem 1120 can include hardware and/or software components to communicate with satellite-based or ground-based location services, such as GPS (global positioning system). In some embodiments, communication subsystem 1120 may include, or interface with, various hardware or software sensors. The sensors may be configured to provide continuous or and/or periodic data or data streams to a computer system through communication subsystem 1120

As shown in FIG. 11, processing system 1122 can include one or more processors or other devices operable to control computing system 1100. Such processors can include single core processors 1124, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1122, such as processors 1124 and 1126, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    receiving, by one or more server devices of a dynamic transportation matching system, a first transport request from a requester computing device associated with a first geohash and a first request matching time period;
    generating, by the one or more server devices, a geohash pairing comprising the first geohash and one or more geohashes associated with the first geohash based on an average estimated time of arrival between geohashes;
    generating, by the one or more server devices, a transport request grouping of the first transport request from the requester computing device with other transport requests from other requester computing devices that are received within the first request matching time period and are associated with the geohash pairing;
    selecting, from the provider computing devices available for assignment, a subset of available provider computing devices that are associated with the geohash pairing;
    monitoring, by the one or more server devices, location information from a plurality of requester computing devices and a plurality of provider computing devices to determine a number of requester computing devices and a number of provider computing devices in a second geohash;
    generating, by the one or more server devices, virtual penalties for candidate transportation matches for transport requests that involve provider computing devices crossing between the second geohash and the first geohash, wherein the virtual penalties are based on a ratio of a number of transport requests and the number of provider computing devices in the second geohash;
    generating, by the one or more server devices, a directed graph by generating a plurality of edges between the first transport request and the other transport requests in the transport request grouping;
    generating a plurality of candidate virtual geographic boundaries wherein edges from the directed graph intersect the plurality of candidate virtual geographic boundaries;
    determining, by the one or more server devices, edge weights for the plurality of edges of the directed graph based on an amount of the subset of available provider computing devices available for assignment to the first transport request and an amount of the subset of available provider computing devices available for assignment to the other transport requests in the transport request grouping;
    determining, for the plurality of candidate virtual geographic boundaries, edge weight combinations, based on the edges from the directed graph that intersect the plurality of candidate virtual geographic boundaries;
    selecting a virtual geographic boundary from the plurality of candidate virtual geographic boundaries based on the edge weight combinations;
    generating, by the one or more server devices, within the first request matching time period and based on the virtual penalties and the directed graph, a transportation match for the first transport request from a first requester computing device and a first provider computing device, wherein the first provider computing device is selected from the subset of available provider computing devices within the virtual geographic boundary; and
    providing, for display via a user interface of the first provider computing device, the transportation match for the first transport request from the first requester computing device and the first provider computing device.

2. The method of claim 1, wherein generating the directed graph further comprises:
    generating transport request nodes corresponding to the first transport request and the other transport requests; and
    generating edges between pairs of the transport request nodes.

3. The method of claim 2, further comprising:
    determining the edge weights for each edge based on a number of providers that overlap a corresponding pair of transport requests in the transport request grouping.

4. The method of claim 1, further comprising:
    determining within the first request matching time period, by the one or more server devices of the dynamic transportation matching system, the provider computing devices available for assignment to the first transport request from the requester computing device.

5. The method of claim 4, wherein selecting the virtual geographic boundary comprises selecting a virtual geographic boundary from the plurality of candidate virtual geographic boundaries based on minimizing an edge weight combination for the selected virtual geographic boundary.

6. The method of claim 1, wherein the virtual penalties are based on a forecasted ratio of the number of transport requests and the number of provider computing devices in the second geohash.

7. The method of claim 3, further comprising selecting a virtual geographic boundary from the plurality of candidate virtual geographic boundaries based on the edge weight combinations and a virtual geographic boundary threshold.

8. A system comprising:
    at least one processor; and a non-transitory computer-readable medium comprising instructions that, when executed by at least one server device, cause the system to:
receive a first transport request from a requester computing device associated with a first geohash, and a first request matching time period;
generate a geohash pairing comprising the first geohash and one or more geohashes associated with the first geohash based an average estimated time of arrival between geohashes;
generate a transport request grouping of the first transport request from the requester computing device with other transport requests from other requester computing devices that are received within the first request matching time period and are associated with the geohash pairing;
select, from provider computing devices available for assignment, a subset of available provider computing devices that are associated with the geohash pairing;
monitor location information from a plurality of requester computing devices and a plurality of provider computing devices to determine a number of requester computing devices and a number of provider computing devices in a second geohash;
generate virtual penalties for candidate transportation matches for transport requests that involve provider computing devices crossing between the second geohash and the first geohash, wherein the virtual penalties are based on a ratio of a number of transport requests and the number of provider computing devices in the second geohash;
generate a directed graph by generating a plurality of edges between the first transport request and the other transport requests in the transport request grouping;
generate a plurality of candidate virtual geographic boundaries wherein edges from the directed graph intersect the plurality of candidate virtual geographic boundaries;
determine edge weights for the plurality of edges of the directed graph based on an amount of the subset of available provider computing devices available for assignment to the first transport request and an amount of the subset of available provider computing devices available for assignment to the other transport requests in the transport request grouping;
determine, for the plurality of candidate virtual geographic boundaries, edge weight combinations, based on the edges from the directed graph that intersect the plurality of candidate virtual geographic boundaries;
select a virtual geographic boundary from the plurality of candidate virtual geographic boundaries based on the edge weight combinations;
generate within the first request matching time period and based on the virtual penalties and the directed graph, a transportation match for the first transport request from a first requester computing device and a first provider computing device, wherein the first provider computing device is selected from the subset of available provider computing devices within the virtual geographic boundary; and
provide, for display via a user interface of the first provider computing device, the transportation match for the first transport request from the first requester computing device and the first provider computing device.

9. The system of claim 8, further comprising instructions that, when executed by the at least one server device, cause the system to:
generate the directed graph by:
generating transport request nodes corresponding to the first transport request and the other transport requests; and
generating edges between pairs of the transport request nodes.

10. The system of claim 9, further comprising instructions, when executed by the at least one server device, cause the system to:
determine the edge weights for each edge based on a number of providers that overlap a corresponding pair of transport requests in the transport request grouping.

11. The system of claim 10, further comprising instructions, when executed by the at least one server device, cause the system to determine, within the first request matching time period, the provider computing devices available for assignment to the first transport request from the requester computing device.

12. The system of claim 11, further comprising instructions, when executed by the at least one server device, cause the system to: select the virtual geographic boundary by selecting a virtual geographic boundary from the plurality of candidate virtual geographic boundaries based on minimizing an edge weight combination for the selected virtual geographic boundary.

13. The system of claim 8, wherein the virtual penalties are based on a forecasted ratio of the number of transport requests and the number of provider computing devices in the second geohash.

14. The system of claim 10, further comprising instructions, when executed by the at least one server device, cause the system to select the virtual geographic boundary from the plurality of candidate virtual geographic boundaries based on the edge weight combinations and a virtual geographic boundary threshold.

15. A non-transitory computer-readable medium comprising instructions that, when executed by at least one processor, cause one or more server devices to:
receive a first transport request from a requester computing device associated with a first geohash, and a first request matching time period;
generate a geohash pairing comprising the first geohash and one or more geohashes associated with the first geohash based on an average estimated time of arrival between geohashes;
generate a transport request grouping of the first transport request from the requester computing device with other transport requests from other requester computing devices that are received within the first request matching time period and are associated with the geohash pairing;
select, from provider computing devices available for assignment, a subset of available provider computing devices that are associated with the geohash pairing;
monitor location information from a plurality of requester computing devices and a plurality of provider computing devices to determine a number of requester computing devices and a number of provider computing devices in a second geohash;
generate virtual penalties for candidate transportation matches for transport requests that involve provider computing devices crossing between the second geohash and the first geohash, wherein the virtual penalties are based on a ratio of a number of transport requests and the number of provider computing devices in the second geohash;

generate a directed graph by generating a plurality of edges between the first transport request and the other transport requests in the transport request grouping;

generate a plurality of candidate virtual geographic boundaries wherein edges from the directed graph intersect the plurality of candidate virtual geographic boundaries;

determine edge weights for the plurality of edges of the directed graph based on an amount of the subset of available provider computing devices available for assignment to the first transport request and an amount of the subset of available provider computing devices available for assignment to the other transport requests in the transport request grouping;

determine, for the plurality of candidate virtual geographic boundaries, edge weight combinations, based on the edges from the directed graph that intersect the plurality of candidate virtual geographic boundaries;

select a virtual geographic boundary from the plurality of candidate virtual geographic boundaries based on the edge weight combinations;

generate, within the first request matching time period, and based on the virtual penalties and the directed graph, a transportation match for the first transport request from a first requester computing device and a first provider computing device, wherein the first provider computing device is selected from the subset of available provider computing devices within the virtual geographic boundary; and provide, for display via a user interface of the first provider computing device, the transportation match for the first transport request from the first requester computing device and the first provider computing device.

16. The non-transitory computer-readable medium of claim 15, wherein the instructions, when executed by the at least one processor, cause the one or more server devices to generate the directed graph by:

generating transport request nodes corresponding to the first transport request and the other transport requests; and generating edges between pairs of the transport request nodes.

17. The non-transitory computer-readable medium of claim 16, wherein the instructions, when executed by the at least one processor, cause the one or more server devices to determine the edge weights for each edge based on a number of providers that overlap a corresponding pair of transport requests in the transport request grouping.

18. The non-transitory computer-readable medium of claim 15, wherein the instructions, when executed by the at least one processor, cause the one or more server devices to; determine, within the first request matching time period, the provider computing devices available for assignment to the first transport request from the requester computing device.

19. The non-transitory computer-readable medium of claim 18, wherein selecting the virtual geographic boundary comprises selecting a virtual geographic boundary from the plurality of candidate virtual geographic boundaries based on minimizing an edge weight combination for the selected virtual geographic boundary.

20. The non-transitory computer-readable medium of claim 17, wherein the instructions, when executed by the at least one processor, cause the one or more server devices to select a virtual geographic boundary from the plurality of candidate virtual geographic boundaries based on the edge weight combinations and a virtual geographic boundary threshold.

\* \* \* \* \*